(12) United States Patent
Wang et al.

(10) Patent No.: US 10,218,856 B2
(45) Date of Patent: Feb. 26, 2019

(54) VOICE SIGNAL PROCESSING METHOD, RELATED APPARATUS, AND SYSTEM

(71) Applicant: HUAWEI TECHNOLOGIES CO., LTD., Shenzhen, Guangdong (CN)

(72) Inventors: Bin Wang, Beijing (CN); Bingyin Xia, Beijing (CN); Zexin Liu, Beijing (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 15/596,260

(22) Filed: May 16, 2017

(65) Prior Publication Data
US 2017/0346954 A1 Nov. 30, 2017

(30) Foreign Application Priority Data
May 31, 2016 (CN) .......................... 2016 1 0379386

(51) Int. Cl.
*G06F 3/16* (2006.01)
*G10L 19/008* (2013.01)
(Continued)

(52) U.S. Cl.
CPC ........... *H04M 11/06* (2013.01); *G10L 19/167* (2013.01); *G10L 19/173* (2013.01);
(Continued)

(58) Field of Classification Search
None
See application file for complete search history.

(56) References Cited

U.S. PATENT DOCUMENTS 6,765,931 B1 * 7/2004 Rabenko ................. H04B 3/23
348/E7.049
7,443,812 B2 * 10/2008 Tackin .................... G10L 25/90
370/286
(Continued)

FOREIGN PATENT DOCUMENTS

CN 1552164 A 12/2004
CN 1708786 A 12/2005
(Continued)

OTHER PUBLICATIONS

Vaseghi et al., "Speech Bandwidth: Extrapolations of Spectral Envelop and Harmonicity Quality of Excitation," 2006 IEEE, ICASSP 2006, XP31386788A, pp. 844-847.
(Continued)

*Primary Examiner* — Marcus T Riley
(74) *Attorney, Agent, or Firm* — Staas & Halsey LLP

(57) ABSTRACT

Present disclosure disclose a voice signal processing method, includes: receiving a first voice coded signal from a first terminal; performing voice decoding processing on the first voice coded signal to obtain a voice decoding parameter and a first voice decoded signal; performing, by using the voice decoding parameter, virtual bandwidth extension processing to obtain a bandwidth extension voice decoded signal corresponding to the first voice decoded signal; after combining the first voice decoded signal and the bandwidth extension voice decoded signal, performing voice coding processing to obtain a second voice coded signal; and sending the second voice coded signal to a second terminal that establishes a call connection to the first terminal, where a maximum frequency bandwidth supported by the first terminal is less than a maximum frequency bandwidth supported by the second terminal. Thus, Service
(Continued)

quality of terminals that have asymmetric maximum frequency bandwidth support capabilities can be improved.

20 Claims, 10 Drawing Sheets

(51) Int. Cl.

| | |
|---|---|
| *H04M 11/06* | (2006.01) |
| *G10L 19/16* | (2013.01) |
| *H04M 7/00* | (2006.01) |
| *H04N 7/15* | (2006.01) |
| *G10L 21/038* | (2013.01) |
| *G10L 19/24* | (2013.01) |

(52) U.S. Cl.
CPC ........... *G10L 21/038* (2013.01); *H04M 7/006* (2013.01); *H04N 7/15* (2013.01); *G10L 19/24* (2013.01)

(56) References Cited

U.S. PATENT DOCUMENTS

| | | | |
|---|---|---|---|
| 7,461,003 B1* | 12/2008 | Tanrikulu | G10L 21/038 704/500 |
| 7,707,034 B2* | 4/2010 | Sun | G10L 19/26 704/262 |
| 2004/0068399 A1* | 4/2004 | Ding | G10L 19/018 704/200.1 |
| 2004/0254786 A1 | 12/2004 | Kirla et al. | |
| 2005/0207502 A1 | 9/2005 | Ozawa | |
| 2005/0267739 A1 | 12/2005 | Kontio et al. | |
| 2007/0005351 A1* | 1/2007 | Sathyendra | G10L 21/038 704/223 |
| 2007/0091873 A1* | 4/2007 | LeBlanc | H04B 3/23 370/352 |
| 2009/0052642 A1* | 2/2009 | Tackin | H04M 7/006 379/93.05 |
| 2009/0138272 A1 | 5/2009 | Kim et al. | |
| 2010/0191525 A1* | 7/2010 | Rabenko | H04B 3/23 704/211 |
| 2016/0196829 A1* | 7/2016 | Liu | G10L 21/038 704/500 |
| 2017/0346954 A1* | 11/2017 | Wang | G10L 19/167 |

FOREIGN PATENT DOCUMENTS

| | | |
|---|---|---|
| CN | 101208972 A | 6/2008 |
| CN | 104517610 A | 4/2015 |
| CN | 104658547 A | 5/2015 |
| CN | 105869653 A | 8/2016 |
| EP | 2 045 800 A1 | 4/2009 |

OTHER PUBLICATIONS

European Office Action dated Mar. 13, 2018, in corresponding European Patent Application No. 17 171 205.2, 5 pgs.
International Search Report dated Feb. 6, 2017 in corresponding International Application No. PCT/CN2016/104157.
European Search Report dated Jul. 13, 2017 in corresponding European Application No. EP 17 17 1205.
Jax, Peter et al., "Bandwidth Extension of Speech Signals: A Catalyst for the Introduction of Wideband Speech Coding?", Wideband Speech Coding Standards and Wireless Services, XP-001546248, IEEE Communications Magazine, May 2006, pp. 106-111.
Laaksonen, Laura et al., "Development, Evaluation and Implementation of an Artificial Bandwidth Extension Method of Telephone Speech in Mobile Terminal", XP-011270938, IEEE Transactions on Consumer Electronics, vol. 55, No. 2, May 2009, pp. 780-787.

\* cited by examiner

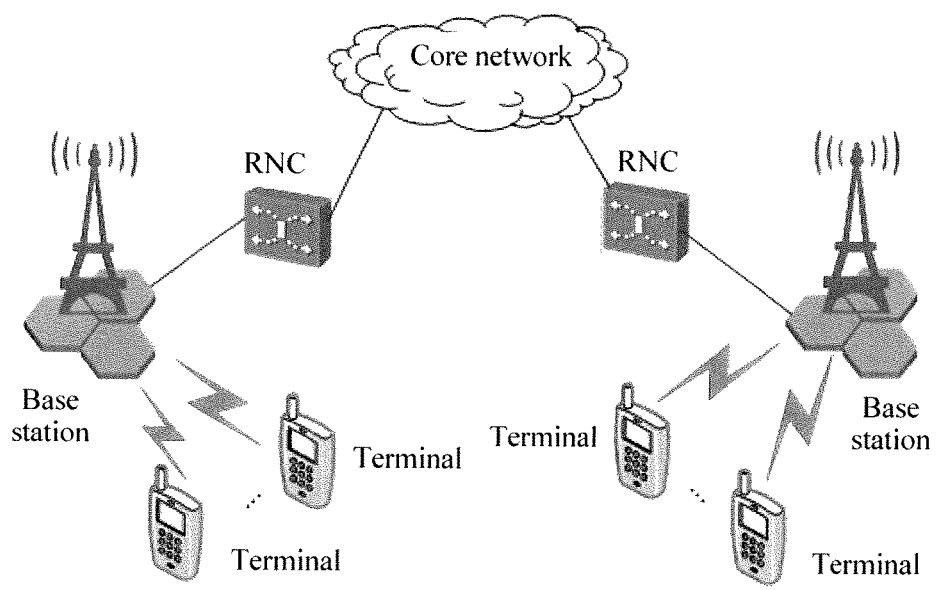
FIG. 1-A
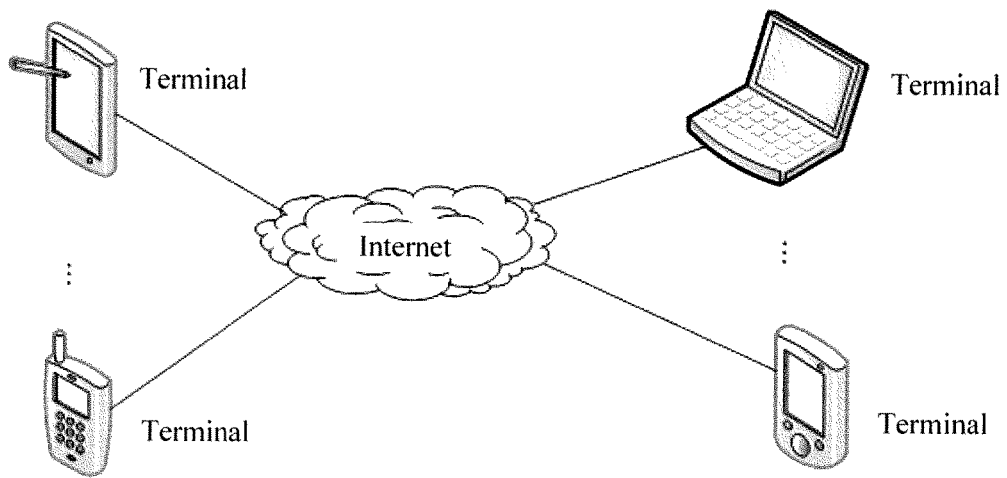
FIG. 1-B

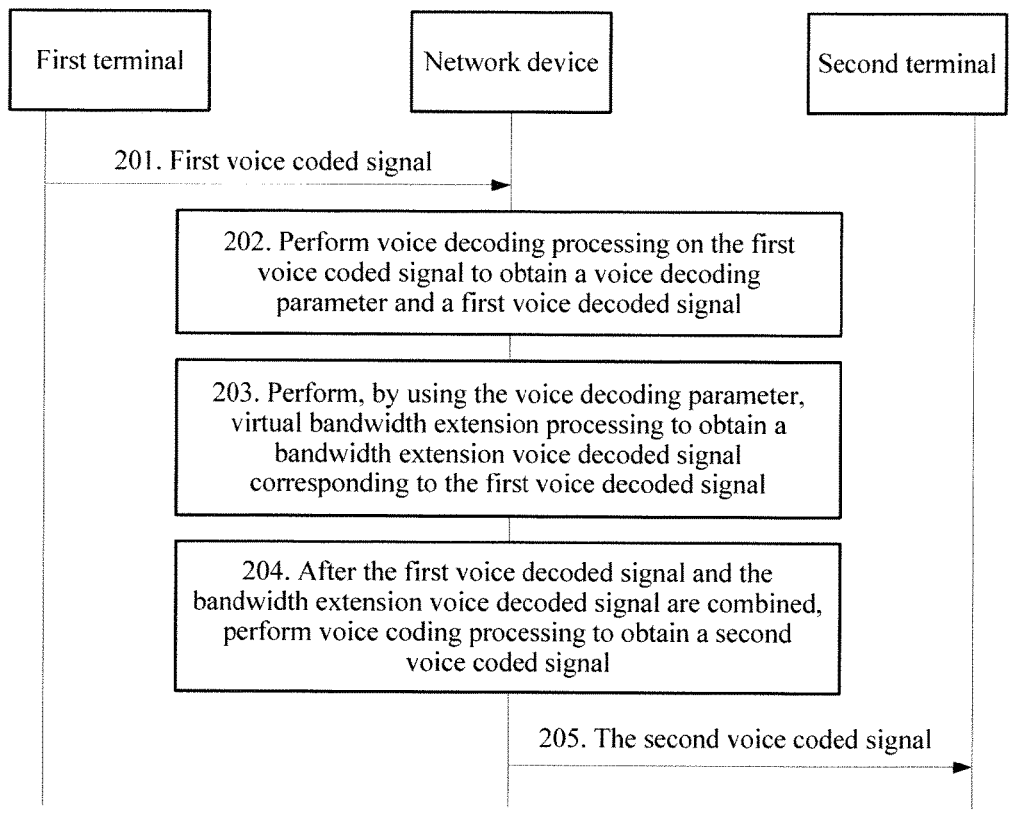
FIG. 2-A

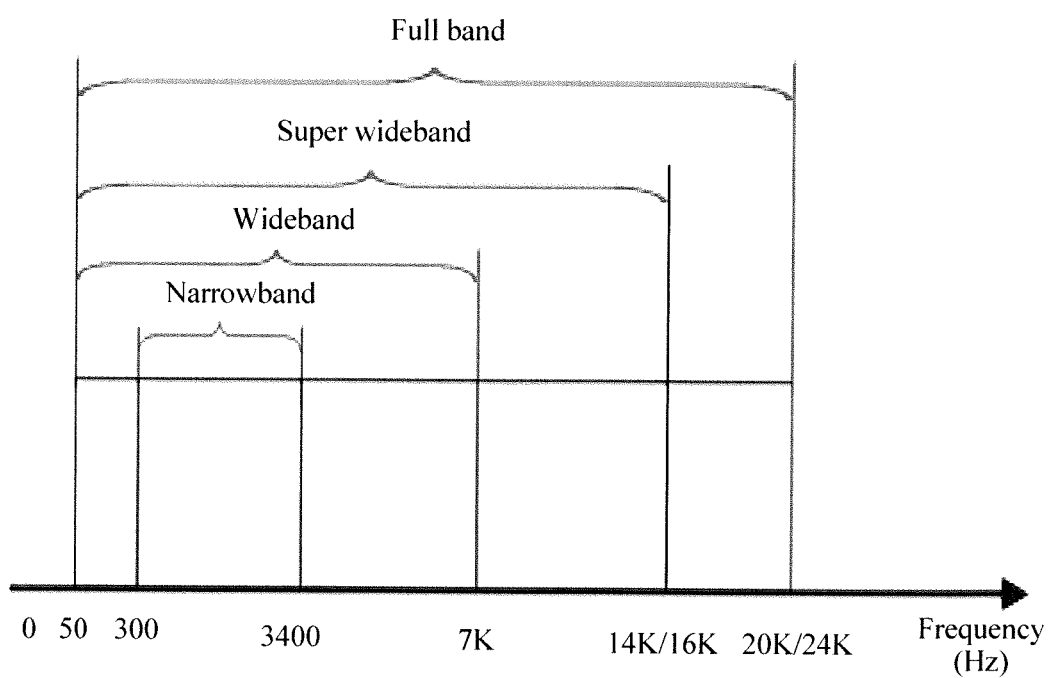
FIG. 2-B

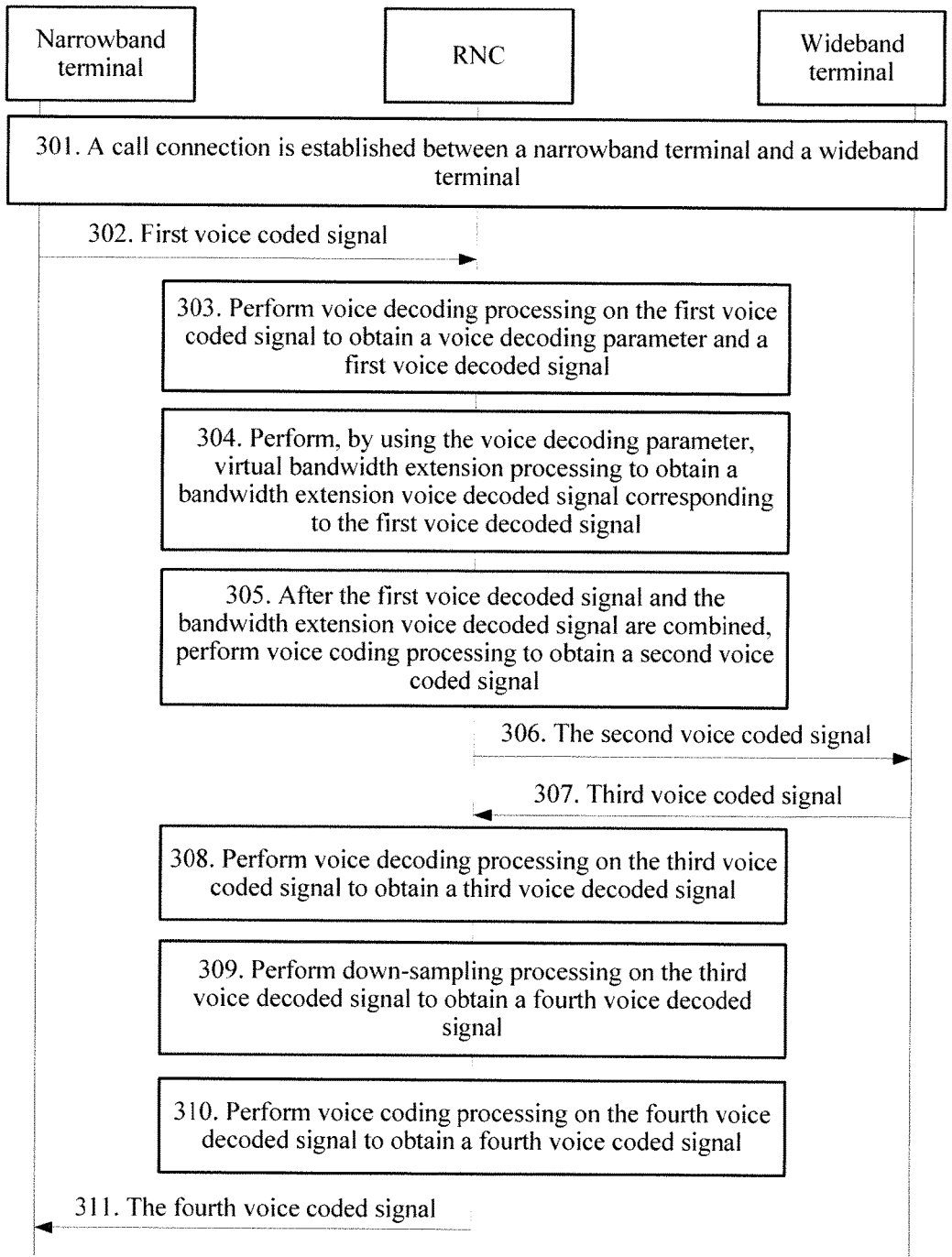
FIG. 3-A

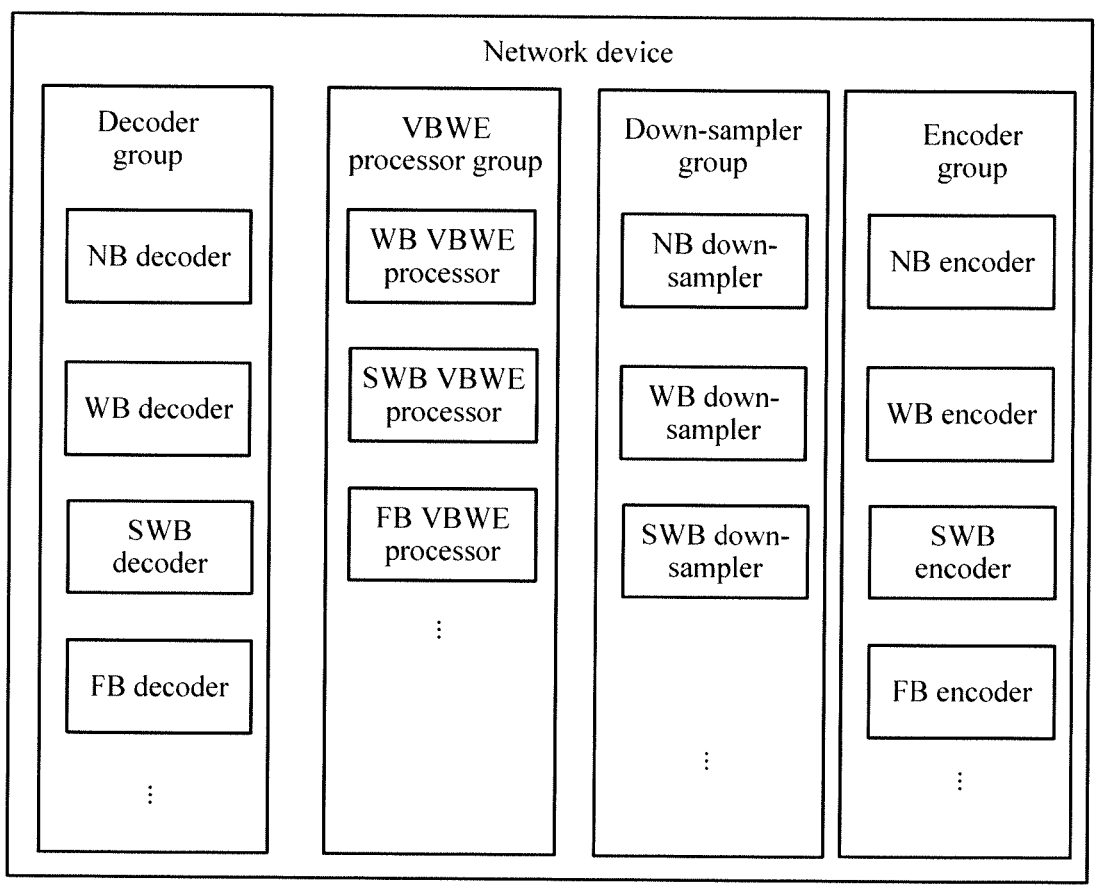
FIG. 3-B

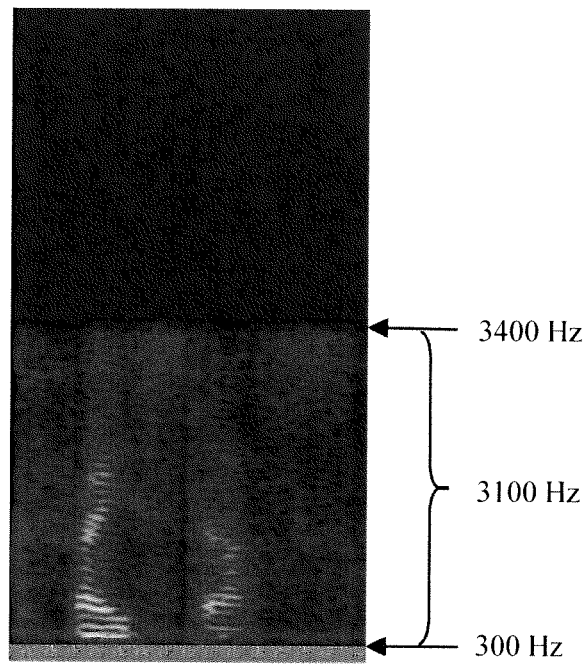
FIG. 3-C
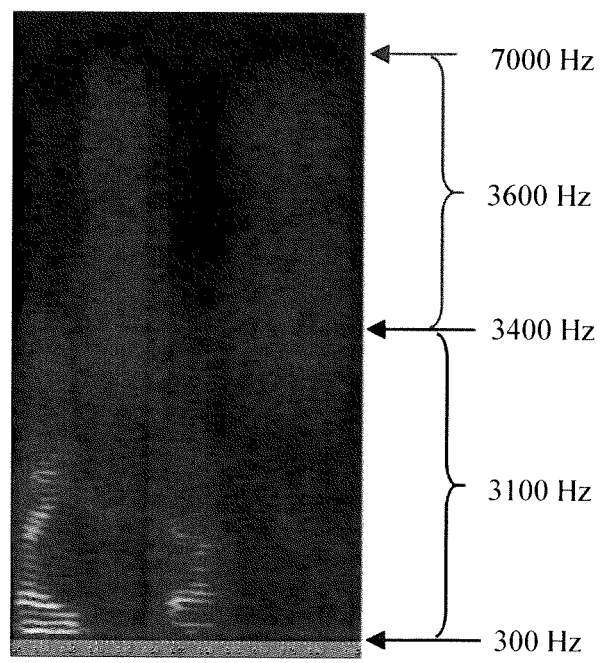
FIG. 3-D

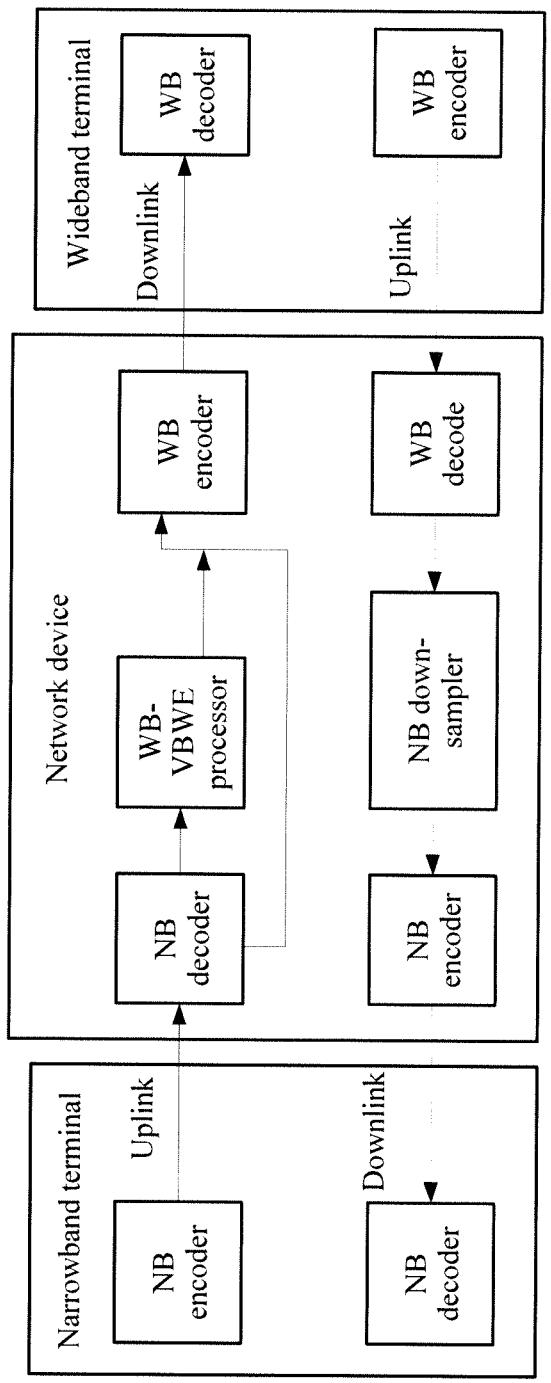
FIG. 3-E

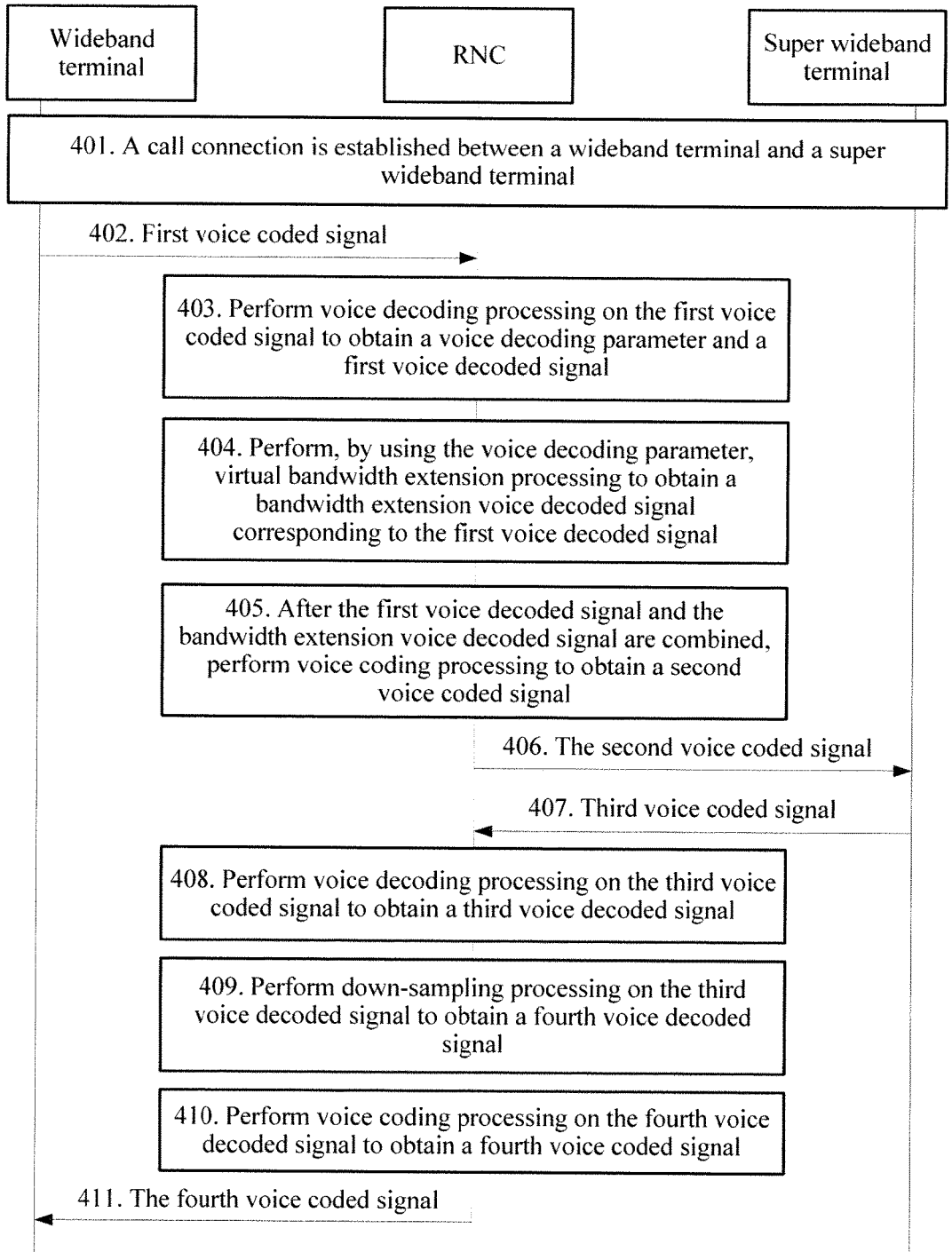
FIG. 4-A

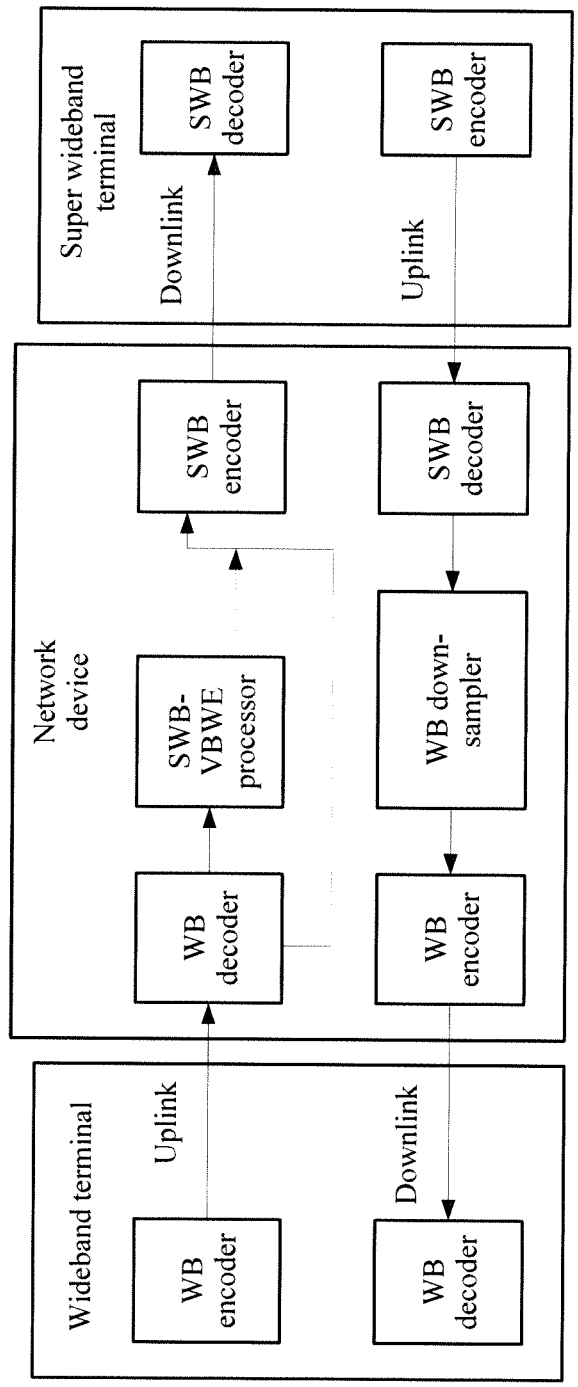
FIG. 4-B

VOICE SIGNAL PROCESSING METHOD, RELATED APPARATUS, AND SYSTEM

CROSS-REFERENCE TO RELATED APPLICATION

This application claims priority to Chinese Patent Application No. 201610379386.0, filed on May 31, 2016, which is hereby incorporated by reference in its entirety.

TECHNICAL FIELD

The present disclosure relates to the field of audio technologies, and in particular, to a voice signal processing method, a related apparatus, and a system.

BACKGROUND

Because of limitation of a transmission bandwidth and other conditions, currently, a frequency bandwidth of a voice signal transmitted on a main telephony network is generally less than 4 kHz, and a frequency band is generally limited to a range of 300 Hz to 3.4 kHz. As a communication bandwidth gradually increases, users impose an increasingly high requirement for voice quality and immersive experience. Consequently, a conventional narrowband voice can no longer meet an experience requirement of a user. In addition, lack of high frequency information in a conventional telephony voice greatly affects users with hearing impairments, and it is usually difficult for the users with hearing impairments to talk over a telephone. Therefore, a wideband voice, even a super wideband voice, and the like become increasingly popular.

Nowadays, 2nd generation (2G), 3rd generation (3G), and 4th generation (4G) networks coexist, and therefore terminals that support various voice bandwidths may coexist. For example, a narrowband terminal with a maximum support capability for a narrowband (NB, Narrowband) voice bandwidth, a wideband terminal with a maximum support capability for a wideband (WB, Wideband) voice bandwidth, a super wideband terminal with a maximum support capability for a super wideband (SWB, Super Wideband) voice bandwidth, and a full band terminal with a maximum support capability for a full band (FB, Full Band) voice bandwidth may coexist.

When a call is placed between two terminals that support a same maximum voice bandwidth, a corresponding voice signal bandwidth service may be established. However, when a call is placed between a terminal supporting a relatively narrow maximum voice bandwidth (for example, NB) and a terminal supporting a relatively wide maximum voice bandwidth (such as WB or SWB), in the conventional solution, the terminal (for example, a WB terminal) supporting a relatively wide maximum voice bandwidth usually can enjoy a voice bandwidth service that is only basically equal to a voice bandwidth service (for example, an NB bandwidth service) of the terminal (for example, an NB terminal) supporting a relatively narrow maximum voice bandwidth.

SUMMARY

Embodiments of the present disclosure provide a voice signal processing method, a related apparatus, and a system.

A first aspect of the embodiments of the present disclosure provides a voice signal processing method, including:

receiving, by a network device, a first voice coded signal from a first terminal; performing, by the network device, voice decoding processing on the first voice coded signal to obtain a voice decoding parameter and a first voice decoded signal; performing, by the network device by using the voice decoding parameter, virtual bandwidth extension processing to obtain a bandwidth extension voice decoded signal corresponding to the first voice decoded signal; after combining the first voice decoded signal and the bandwidth extension voice decoded signal, performing, by the network device, voice coding processing to obtain a second voice coded signal; and sending, by the network device, the second voice coded signal to a second terminal that establishes a call connection to the first terminal, where a maximum frequency bandwidth supported by the first terminal is less than a maximum frequency bandwidth supported by the second terminal.

For example, the maximum frequency bandwidth supported by the first terminal and the maximum frequency bandwidth supported by the second terminal may be two of the following typical frequency bandwidths: narrowband (NB), wideband (WB), super wideband (SWB), or full band (FB). That is, the first terminal may be, a narrowband terminal, a wideband terminal, or a super wideband terminal, and the second terminal may be a wideband terminal, a super wideband terminal, or a full band terminal. Certainly, the maximum frequency bandwidth supported by the first terminal and the maximum frequency bandwidth supported by the second terminal are not limited to the typical frequency bandwidths in the foregoing example.

A frequency bandwidth of the first voice coded signal is less than a frequency bandwidth of the second voice coded signal, and a sampling rate of the first voice coded signal is less than a sampling rate of the second voice coded signal.

The frequency bandwidth of the first voice coded signal is less than or equal to the maximum frequency bandwidth supported by the first terminal. For example, when the first terminal is a narrowband terminal, the first voice coded signal may be a narrowband voice coded signal. When the first terminal is a wideband terminal, the first voice coded signal may be a wideband voice coded signal or a narrowband voice coded signal. When the first terminal is a super wideband terminal, the first voice coded signal may be a super wideband voice coded signal, a narrowband voice coded signal, or a wideband voice coded signal.

The frequency bandwidth of the first voice coded signal is less than the frequency bandwidth of the second voice coded signal. The sampling rate of the first voice coded signal is less than the sampling rate of the second voice coded signal. For example, a frequency band of the first voice coded signal may be a subset of a frequency band of the second voice coded signal. Certainly, an intersection set between the frequency band of the first voice coded signal and the frequency band of the second voice coded signal may not be equal to the frequency band of the first voice coded signal.

The bandwidth extension voice decoded signal may include a high bandwidth extension voice decoded signal, and the bandwidth extension voice decoded signal may further include a low bandwidth extension voice decoded signal. For example, it is assumed that a frequency bandwidth of the first voice decoded signal is 3400 Hz–300 Hz=3100 Hz. A bandwidth extension voice decoded signal corresponding to the first voice decoded signal may include the high bandwidth extension voice decoded signal (for example, 7000 Hz–3400 Hz=3600 Hz), and a bandwidth extension voice decoded signal corresponding to the first voice decoded signal may further include the low bandwidth extension voice decoded signal (for example, 300 Hz–50 Hz=250 Hz). For another example, it is assumed that a frequency bandwidth of the first voice decoded signal is 7000 Hz–50 Hz=6950 Hz. A bandwidth extension voice decoded signal corresponding to the first voice decoded signal may include the high bandwidth extension voice decoded signal (specifically, for example, 14000 Hz–7000 Hz=7000 Hz). For another example, it is assumed that a frequency bandwidth of the first voice decoded signal is 14 kHz–50 Hz=13950 Hz. A bandwidth extension voice decoded signal corresponding to the first voice decoded signal may include the high bandwidth extension voice decoded signal (specifically, for example, 24 kHz–14 kHz=10 kHz). Another situation may be learned by analogy.

The network device involved in this embodiment may be, for example, a base station, a radio network controller, a core network device, or another network device. For example, the network device may be specifically a base station or a radio network controller in a radio access network accessed by the second terminal, or a base station or a radio network controller in a radio access network accessed by the first terminal, or may be a core network device, such as a packet data gateway or a serving gateway.

A first terminal and a second terminal may be user equipment that has a call function, such as a mobile phone, a tablet computer, a personal computer, or a notebook computer.

It can be learned that, in the foregoing technical solution, after receiving a first voice coded signal from a first terminal supporting a relatively narrow bandwidth, a network device performs voice decoding processing on the first voice coded signal to obtain a voice decoding parameter and a first voice decoded signal. The network device performs, by using the voice decoding parameter, virtual bandwidth extension processing to obtain a bandwidth extension voice decoded signal corresponding to the first voice decoded signal. Then, after combining the first voice decoded signal and the bandwidth extension voice decoded signal, the network device performs voice coding processing to obtain a second voice coded signal, and then sends the second voice coded signal to a second terminal supporting a relatively wide bandwidth. The network device at a transit location performs virtual bandwidth extension on a voice coded signal that is sent by the first terminal supporting a relatively narrow bandwidth to the second terminal supporting a relatively wide bandwidth. Therefore, further, a downlink voice coded signal of the second terminal supporting a relatively wide bandwidth can better match a maximum frequency bandwidth support capability of the second terminal, so that the second terminal supporting a relatively wide bandwidth can enjoy a voice signal bandwidth service that matches the maximum frequency bandwidth support capability of the second terminal. In addition, special function enhancement does not need to be performed on the second terminal, thereby improving call experience of a user. It can be learned that, in the foregoing example, service quality of terminals that have asymmetric maximum frequency bandwidth support capabilities can be improved.

With reference to the first aspect, in a first possible implementation manner of the first aspect, the performing, by using the voice decoding parameter, virtual bandwidth extension processing to obtain a bandwidth extension voice decoded signal corresponding to the first voice decoded signal includes:

estimating, by using the voice decoding parameter, a bandwidth extension excitation signal corresponding to the first voice decoded signal; estimating, by using the voice decoding parameter, a bandwidth extension spectral envelope corresponding to the first voice decoded signal; and performing, by using a filter corresponding to the bandwidth extension spectral envelope, synthesis processing on the bandwidth extension excitation signal to obtain the bandwidth extension voice decoded signal corresponding to the first voice decoded signal.

With reference to the first possible implementation manner of the first aspect, in a second possible implementation manner of the first aspect, the estimating, by using the voice decoding parameter, a bandwidth extension excitation signal corresponding to the first voice decoded signal includes: estimating, by using the voice decoding parameter and based on a spectrum folding algorithm, a white noise excitation algorithm, or a harmonic noise model algorithm, the bandwidth extension excitation signal corresponding to the first voice decoded signal.

With reference to the first possible implementation manner of the first aspect or the second possible implementation manner of the first aspect, in a third possible implementation manner of the first aspect, the estimating, by using the voice decoding parameter, a bandwidth extension spectral envelope corresponding to the first voice decoded signal includes: estimating, by using the voice decoding parameter and based on a linear mapping method, a codebook mapping method, or a statistics mapping method, the bandwidth extension spectral envelope corresponding to the first voice decoded signal.

With reference to any one of the first aspect, or the first to the third possible implementation manners of the first aspect, in a fourth possible implementation manner of the first aspect, the voice decoding parameter includes a pitch period, a voicing factor, and a linear predictive coding parameter.

With reference to any one of the first aspect, or the first to the fourth possible implementation manners of the first aspect, in a fifth possible implementation manner of the first aspect, the performing voice decoding processing on the first voice coded signal to obtain a voice decoding parameter and a first voice decoded signal includes: selecting, from multiple voice decoders, a voice decoder corresponding to the maximum frequency bandwidth supported by the first terminal, and performing the voice decoding processing on the first voice coded signal to obtain the voice decoding parameter and the first voice decoded signal.

It can be understood that multiple voice decoders are built in a network device; and selecting, according to a requirement, an appropriate voice decoder to perform decoding on a voice coded signal helps improve a transcoding support capability and a response processing speed of the network device.

With reference to any one of the first aspect, or the first to the fifth possible implementation manners of the first aspect, in a sixth possible implementation manner of the first aspect, the performing, by using the voice decoding parameter, virtual bandwidth extension processing to obtain a bandwidth extension voice decoded signal corresponding to the first voice decoded signal includes: selecting, from multiple virtual bandwidth extension processors, a virtual bandwidth extension processor corresponding to the maximum frequency bandwidth supported by the second terminal, and performing, by using the voice decoding parameter, the virtual bandwidth extension processing to obtain the bandwidth extension voice decoded signal corresponding to the first voice decoded signal.

With reference to any one of the first aspect, or the first to the sixth possible implementation manners of the first aspect, in a seventh possible implementation manner of the first aspect, after combining the first voice decoded signal and the bandwidth extension voice decoded signal, the performing voice coding processing to obtain a second voice coded signal includes: selecting, from multiple voice encoders, a voice encoder corresponding to the maximum frequency bandwidth supported by the second terminal, and after combining the first voice decoded signal and the bandwidth extension voice decoded signal, performing the voice coding processing to obtain the second voice coded signal.

With reference to any one of the first aspect, or the first to the seventh possible implementation manners of the first aspect, in an eighth possible implementation manner of the first aspect, frequency bandwidths of the first voice coded signal and the second voice coded signal are two of the following frequency bandwidths: narrowband, wideband, super wideband, or full band.

With reference to any one of the first aspect, or the first to the eighth possible implementation manners of the first aspect, in a ninth possible implementation manner of the first aspect, the voice signal processing method further includes:

receiving, by the network device, a third voice coded signal from the second terminal;

performing, by the network device, voice decoding processing on the third voice coded signal to obtain a third voice decoded signal;

performing, by the network device, down-sampling processing on the third voice decoded signal to obtain a fourth voice decoded signal; and performing, by the network device, voice coding processing on the fourth voice decoded signal to obtain a fourth voice coded signal, where a frequency bandwidth of the fourth voice coded signal is less than a frequency bandwidth of the third voice coded signal, and a sampling rate of the fourth voice coded signal is less than a sampling rate of the third voice coded signal; and sending, by the network device, the fourth voice coded signal to the first terminal; or after the network device performs voice enhancement processing on the fourth voice coded signal to obtain a fourth voice coded signal obtained after the voice enhancement processing, sending the fourth voice coded signal obtained after the voice enhancement processing to the first terminal.

It can be understood that performing voice enhancement processing on a voice coded signal sent to a first terminal helps improve a gain of a voice coded signal received by the first terminal, and further helps improve call experience of a terminal with a support capability for a relatively narrow bandwidth.

With reference to the ninth possible implementation manner of the first aspect, in a tenth possible implementation manner of the first aspect, the performing voice decoding processing on the third voice coded signal to obtain a third voice decoded signal includes: selecting, from multiple voice decoders, a voice decoder corresponding to the maximum frequency bandwidth supported by the second terminal, and performing the voice decoding processing on the third voice coded signal to obtain the third voice decoded signal.

With reference to any one of the ninth to the tenth possible implementation manners of the first aspect, in an eleventh possible implementation manner of the first aspect, the performing down-sampling processing on the third voice decoded signal to obtain a fourth voice decoded signal includes: selecting, from multiple down-samplers, a down-sampler corresponding to the maximum frequency bandwidth supported by the first terminal, and performing the down-sampling processing on the third voice decoded signal to obtain the fourth voice decoded signal.

With reference to any one of the ninth to the eleventh possible implementation manners of the first aspect, in a twelfth possible implementation manner of the first aspect, the performing voice coding processing on the fourth voice decoded signal to obtain a fourth voice coded signal includes: selecting, from multiple voice encoders, a voice encoder corresponding to the maximum frequency bandwidth supported by the first terminal, and performing the voice coding processing on the fourth voice decoded signal to obtain the fourth voice coded signal.

With reference to any one of the first aspect, or the first to the twelfth possible implementation manners of the first aspect, in a thirteenth possible implementation manner of the first aspect, the network device is a base station, a radio network controller, or a core network device.

A second aspect of the embodiments of the present disclosure provides a network device, including:

a communications interface, configured to receive a first voice coded signal from a first terminal;

a first voice decoder, configured to perform voice decoding processing on the first voice coded signal to obtain a voice decoding parameter and a first voice decoded signal;

a first virtual bandwidth extension processor, configured to perform, by using the voice decoding parameter, virtual bandwidth extension processing to obtain a bandwidth extension voice decoded signal corresponding to the first voice decoded signal; and a first voice encoder, configured to: after combining the first voice decoded signal and the bandwidth extension voice decoded signal, perform voice coding processing to obtain a second voice coded signal, where a frequency bandwidth of the first voice coded signal is less than a frequency bandwidth of the second voice coded signal, and a sampling rate of the first voice coded signal is less than a sampling rate of the second voice coded signal; where the communications interface is further configured to send the second voice coded signal to a second terminal that establishes a call connection to the first terminal, and a maximum frequency bandwidth supported by the first terminal is less than a maximum frequency bandwidth supported by the second terminal.

It can be understood that a first voice decoder, a first virtual bandwidth extension processor, and a first voice encoder may be integrated.

With reference to the second aspect, in a first possible implementation manner of the second aspect, the first virtual bandwidth extension processor is specifically configured to: estimate, by using the voice decoding parameter, a bandwidth extension excitation signal corresponding to the first voice decoded signal; estimate, by using the voice decoding parameter, a bandwidth extension spectral envelope corresponding to the first voice decoded signal; and perform, by using a filter corresponding to the bandwidth extension spectral envelope, synthesis processing on the bandwidth extension excitation signal to obtain the bandwidth extension voice decoded signal corresponding to the first voice decoded signal.

With reference to the first possible implementation manner of the second aspect, in a second possible implementation manner of the second aspect, in a process of estimating, by using the voice decoding parameter, the bandwidth extension excitation signal corresponding to the first voice decoded signal, the first virtual bandwidth extension processor is specifically configured to estimate, by using the voice decoding parameter and based on a spectrum folding algorithm, a white noise excitation algorithm, or a harmonic noise model algorithm, the bandwidth extension excitation signal corresponding to the first voice decoded signal.

With reference to the first possible implementation manner of the second aspect or the second possible implementation manner of the second aspect, in a third possible implementation manner of the second aspect, in a process of estimating, by using the voice decoding parameter, the bandwidth extension spectral envelope corresponding to the first voice decoded signal, the first virtual bandwidth extension processor is specifically configured to estimate, by using the voice decoding parameter and based on a linear mapping method, a codebook mapping method, or a statistics mapping method, the bandwidth extension spectral envelope corresponding to the first voice decoded signal.

With reference to any one of the second aspect, or the first to the third possible implementation manners of the second aspect, in a fourth possible implementation manner of the second aspect, the voice decoding parameter includes a pitch period, a voicing factor, and a linear predictive coding parameter.

With reference to any one of the second aspect, or the first to the fourth possible implementation manners of the second aspect, in a fifth possible implementation manner of the second aspect, the network device includes multiple voice decoders, and the first voice decoder is a voice decoder that is in multiple voice decoders and that is corresponding to the maximum frequency bandwidth supported by the first terminal.

With reference to any one of the second aspect, or the first to the fifth possible implementation manners of the second aspect, in a sixth possible implementation manner of the second aspect, the network device includes multiple virtual bandwidth extension processors, and the first virtual bandwidth extension processor is a virtual bandwidth extension processor that is in multiple virtual bandwidth extension processors and that is corresponding to the maximum frequency bandwidth supported by the second terminal.

With reference to any one of the second aspect, or the first to the sixth possible implementation manners of the second aspect, in a seventh possible implementation manner of the second aspect, the network device includes multiple voice encoders, and the first voice encoder is a voice encoder that is in multiple voice encoders and that is corresponding to the maximum frequency bandwidth supported by the second terminal.

With reference to any one of the second aspect, or the first to the seventh possible implementation manners of the second aspect, in an eighth possible implementation manner of the second aspect, frequency bandwidths of the first voice coded signal and the second voice coded signal are two of the following frequency bandwidths: narrowband, wideband, super wideband, or full band.

With reference to any one of the second aspect, or the first to the eighth possible implementation manners of the second aspect, in a ninth possible implementation manner of the second aspect, the network device further includes a second voice decoder, a second voice encoder, and a first down-sampler;

the communications interface is further configured to receive a third voice coded signal from the second terminal;

the second voice decoder is configured to perform voice decoding processing on the third voice coded signal to obtain a third voice decoded signal;

the first down-sampler is configured to perform down-sampling processing on the third voice decoded signal to obtain a fourth voice decoded signal;

the second voice encoder is configured to perform voice coding processing on the fourth voice decoded signal to obtain a fourth voice coded signal, where a frequency bandwidth of the fourth voice coded signal is less than a frequency bandwidth of the third voice coded signal, and a sampling rate of the fourth voice coded signal is less than a sampling rate of the third voice coded signal; and the communications interface is further configured to send the fourth voice coded signal to the first terminal; or the communications interface is further configured to: after performing voice enhancement processing on the fourth voice coded signal to obtain a fourth voice coded signal obtained after the voice enhancement processing, send the fourth voice coded signal obtained after the voice enhancement processing to the first terminal.

With reference to the ninth possible implementation manner of the second aspect, in a tenth possible implementation manner of the second aspect, the network device includes multiple voice decoders, and the second voice decoder is a voice decoder corresponding to the maximum frequency bandwidth supported by the second terminal.

With reference to any one of the ninth to the tenth possible implementation manners of the second aspect, in an eleventh possible implementation manner of the second aspect, the network device includes multiple down-samplers, and the first down-sampler is a down-sampler that is in multiple down-samplers and that is corresponding to the maximum frequency bandwidth supported by the first terminal.

With reference to any one of the ninth to the eleventh possible implementation manners of the second aspect, in a twelfth possible implementation manner of the second aspect, the network device includes multiple voice encoders, and the second voice encoder is a voice encoder corresponding to the maximum frequency bandwidth supported by the first terminal.

With reference to any one of the second aspect, or the first to the twelfth possible implementation manners of the second aspect, in a thirteenth possible implementation manner of the second aspect, the network device is a base station, a radio network controller, or a core network device.

In addition, a third aspect of the embodiments of the present disclosure provides a network device, including a storage unit, a communications interface, and a processor coupled to the storage unit and the communications interface, where the storage unit is configured to store an instruction, the processor is configured to execute the instruction, and the communications interface is configured to communicate with another device under control of the processor; and when executing the instruction, the processor may perform, according to the instruction, the method performed by the network device in the first aspect.

In addition, a fourth aspect of the embodiments of the present disclosure provides a computer readable storage medium, where the computer readable storage medium stores program code used in voice signal processing performed by a network device, and the program code includes the instruction used to be executed in the method performed by the network device in the first aspect.

In addition, a fifth aspect of the embodiments of the present disclosure further provides a network device, where a unit included in the network device can perform the method performed by the network device in the first aspect.

A sixth aspect of the embodiments of the present disclosure provides a communications system, including any network device provided in the embodiments of the present disclosure.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1-A and FIG. 1-B are schematic diagrams of two network architectures according to an embodiment of the present disclosure;

FIG. 2-A is a schematic diagram of a voice signal processing method according to an embodiment of the present disclosure;

FIG. 2-B is a schematic diagram of an example of a spectrum range of a typical frequency band according to an embodiment of the present disclosure;

FIG. 3-A is a schematic diagram of another voice signal processing method according to an embodiment of the present disclosure;

FIG. 3-B is a schematic diagram illustrating internal devices of a network device according to an embodiment of the present disclosure;

FIG. 3-C is a schematic diagram of a spectrum range of narrowband according to an embodiment of the present disclosure;

FIG. 3-D is a schematic diagram of a spectrum range of wideband extended from narrowband according to an embodiment of the present disclosure;

FIG. 3-E is a schematic diagram of a flow direction of a voice signal according to an embodiment of the present disclosure;

FIG. 4-A is a schematic diagram of another voice signal processing method according to an embodiment of the present disclosure;

FIG. 4-B is a schematic diagram of a flow direction of a voice signal according to an embodiment of the present disclosure;

DESCRIPTION OF EMBODIMENTS

Figure 5:
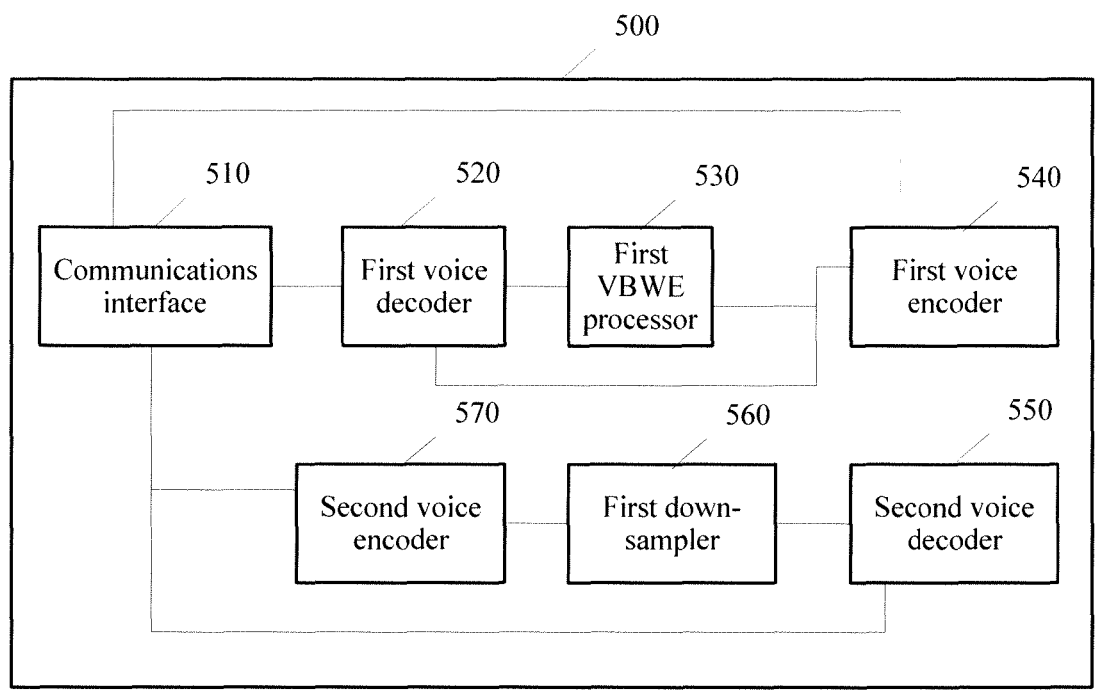
FIG. 5 is a schematic structural diagram of a network device according to an embodiment of the present disclosure.

The terms "include" and "have" and any variants thereof in the specification, claims, and accompanying drawings of the present disclosure are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. In addition, the terms "first", "second", "third", and so on are intended to distinguish between different objects but are not intended to describe a specific order.

In the following, first, referring to FIG. 1-A and FIG. 1-B, FIG. 1-A and FIG. 1-B are schematic diagrams of two possible network architectures according to an embodiment of this application. In the network architecture shown in FIG. 1-A, a call connection is established between terminals by using an access network and a core network. The voice signal processing methods provided in some embodiments of this application may be performed by an access network device or a core network device. For example, the voice signal processing methods provided in some embodiments of this application may be performed by some servers (such as a conferencing server or a network telephony server) on the Internet.

The terminal involved in this embodiment of the present disclosure may be an apparatus that has a function such as collecting, storing, or transmitting a voice signal. Specifically, the terminal may be, for example, a mobile phone, a tablet computer, a personal computer, or a notebook computer.

Referring to FIG. 2-A, FIG. 2-A is a schematic flowchart of a voice signal processing method according to an embodiment of this application. As shown in an example in FIG. 2-A, the voice signal processing method provided in this embodiment of this application may include the following steps.

201. A first terminal sends a first voice coded signal.

After a call connection is established between the first terminal and a second terminal, the first terminal may send the first voice coded signal based on the call connection. The second terminal may also send a voice coded signal based on the call connection.

The call connection may be a call connection based on a mobile communications network, or may be a call connection based on the Internet.

In the example of this embodiment of this application, a maximum frequency bandwidth supported by the first terminal is less than a maximum frequency bandwidth supported by the second terminal.

For example, the maximum frequency bandwidth supported by the first terminal and the maximum frequency bandwidth supported by the second terminal may be two of the following typical frequency bandwidths: narrowband (NB), wideband (WB), super wideband (SWB), or full band (FB). That is, the first terminal may be, a narrowband terminal, a wideband terminal, or a super wideband terminal, and the second terminal may be a wideband terminal, a super wideband terminal, or a full band terminal. Certainly, the maximum frequency bandwidth supported by the first terminal and the maximum frequency bandwidth supported by the second terminal are not limited to the typical frequency bandwidths in the foregoing example.

Referring to FIG. 2-B, FIG. 2-B shows an example of a range of a typical frequency bandwidth, such as narrowband (NB), wideband (WB), super wideband (SWB), and full band (FB). Certainly, a range boundary of these typical frequency bands is not limited to an example shown in the figure.

A frequency bandwidth of the first voice coded signal is less than or equal to the maximum frequency bandwidth supported by the first terminal. For example, when the first terminal is a narrowband terminal, the first voice coded signal may be a narrowband voice coded signal. When the first terminal is a wideband terminal, the first voice coded signal may be a wideband voice coded signal or a narrowband voice coded signal. When the first terminal is a super wideband terminal, the first voice coded signal may be a super wideband voice coded signal, a narrowband voice coded signal, or a wideband voice coded signal.

202. The network device receives the first voice coded signal from the first terminal, and the network device performs voice decoding processing on the first voice coded signal to obtain a voice decoding parameter and a first voice decoded signal.

For example, the voice decoding parameter may include a pitch period, a voicing factor, and a linear predictive coding parameter.

203. The network device performs, by using the voice decoding parameter, virtual bandwidth extension processing to obtain a bandwidth extension voice decoded signal corresponding to the first voice decoded signal.

The virtual bandwidth extension processing is performed by using the voice decoding parameter to obtain the bandwidth extension voice decoded signal corresponding to the first voice decoded signal, and a main mechanism is use of correlation between a low frequency band voice signal and a high frequency band voice signal. Therefore, various related bandwidth extension algorithms based on the foregoing mechanism may be optionally used to perform the VBWE (Virtual Bandwidth Extension, virtual bandwidth extension) processing.

The bandwidth extension voice decoded signal may include a high bandwidth extension voice decoded signal, and the bandwidth extension voice decoded signal may further include a low bandwidth extension voice decoded signal. For example, it is assumed that a frequency bandwidth of the first voice decoded signal is 3400 Hz–300 Hz=3100 Hz. A bandwidth extension voice decoded signal corresponding to the first voice decoded signal may include the high bandwidth extension voice decoded signal (for example, 7000 Hz–3400 Hz=3600 Hz), and a bandwidth extension voice decoded signal corresponding to the first voice decoded signal may further include the low bandwidth extension voice decoded signal (for example, 300 Hz–50 Hz=250 Hz). For another example, it is assumed that a frequency bandwidth of the first voice decoded signal is 7000 Hz–50 Hz=6950 Hz. A bandwidth extension voice decoded signal corresponding to the first voice decoded signal may include the high bandwidth extension voice decoded signal (specifically, for example, 14000 Hz–7000 Hz=7000 Hz). For another example, it is assumed that a frequency bandwidth of the first voice decoded signal is 14 kHz–50 Hz=13950 Hz. A bandwidth extension voice decoded signal corresponding to the first voice decoded signal may include the high bandwidth extension voice decoded signal (specifically, for example, 24 kHz–14 kHz=10 kHz). Another situation may be learned by analogy.

204. After combining the first voice decoded signal and the bandwidth extension voice decoded signal, the network device performs voice coding processing to obtain a second voice coded signal.

The frequency bandwidth of the first voice coded signal is less than a frequency bandwidth of the second voice coded signal. A sampling rate of the first voice coded signal is less than a sampling rate of the second voice coded signal. For example, a frequency band of the first voice coded signal may be a subset of a frequency band of the second voice coded signal. Certainly, an intersection set between the frequency band of the first voice coded signal and the frequency band of the second voice coded signal may not be equal to the frequency band of the first voice coded signal.

205. The network device sends the second voice coded signal to a second terminal that establishes a call connection to the first terminal.

Correspondingly, the second terminal may receive the second voice coded signal, and perform decoding on the second voice coded signal and play a signal obtained after the decoding.

The network device involved in this embodiment may be, for example, a base station, a radio network controller, a core network device, or another network device. For example, the network device may be specifically a base station or a radio network controller in a radio access network accessed by the second terminal, or a base station or a radio network controller in a radio access network accessed by the first terminal, or may be a core network device, such as a packet data gateway or a serving gateway.

A first terminal and a second terminal may be user equipment that has a call function, such as a mobile phone, a tablet computer, a personal computer, or a notebook computer.

It can be learned that, in the solution of this embodiment, after receiving a first voice coded signal from a first terminal supporting a relatively narrow bandwidth, a network device performs voice decoding processing on the first voice coded signal to obtain a voice decoding parameter and a first voice decoded signal. The network device performs, by using the voice decoding parameter, virtual bandwidth extension processing to obtain a bandwidth extension voice decoded signal corresponding to the first voice decoded signal. Then, after combining the first voice decoded signal and the bandwidth extension voice decoded signal, the network device performs voice coding processing to obtain a second voice coded signal, and then sends the second voice coded signal to a second terminal supporting a relatively wide bandwidth. The network device at a transit location performs virtual bandwidth extension on a voice coded signal that is sent by the first terminal supporting a relatively narrow bandwidth to the second terminal supporting a relatively wide bandwidth. Therefore, further, a downlink voice coded signal of the second terminal supporting a relatively wide bandwidth can better match a maximum frequency bandwidth support capability of the second terminal, so that the second terminal supporting a relatively wide bandwidth can enjoy a voice signal bandwidth service that matches the maximum frequency bandwidth support capability of the second terminal. In addition, special function enhancement does not need to be performed on the second terminal, thereby improving call experience of a user.

The following first provides more detailed description with reference to related accompanying drawings.

Referring to FIG. 3-A, FIG. 3-A is a schematic flowchart of a voice signal processing method according to an embodiment of this application. As shown in an example in FIG. 3-A, the voice signal processing method provided in this embodiment of this application may include the following steps.

301. A call connection is established between a narrowband terminal and a wideband terminal.

302. The narrowband terminal performs coding on a voice to obtain a first voice coded signal, and sends the first voice coded signal based on the call connection.

In this embodiment, it is assumed that a first terminal is the narrowband terminal and a second terminal is the wideband terminal. A maximum frequency bandwidth supported by the narrowband terminal is narrowband (for example, 3400 Hz–300 Hz=3100 Hz), and a maximum frequency bandwidth supported by the wideband terminal is wideband (for example, 7000 Hz–50 Hz=6950 Hz).

Specifically, for example, the narrowband terminal may perform, by using an AMR NB encoder or another NB encoder, voice coding on a voice sampling signal to obtain a first voice coded signal. A sampling rate of the first voice coded signal is 8 kHz. A frequency bandwidth of the first voice coded signal is BW1=3400 Hz−300 Hz=3100 Hz.

303. An RNC receives the first voice coded signal from the narrowband terminal, and the RNC performs voice decoding processing on the first voice coded signal to obtain a voice decoding parameter and a first voice decoded signal.

For example, the voice decoding parameter may include a pitch period, a voicing factor, and a linear predictive coding parameter.

It is assumed that a voice decoder group including multiple voice decoders (for example, the voice decoder group may include an NB decoder, a WB decoder, an SWB decoder, and an FB decoder) exists in the RNC. The RNC may select, based on the maximum frequency bandwidth (for example, NB) supported by the narrowband terminal, the NB decoder from the voice decoder group, and perform voice decoding processing on the first voice coded signal to obtain the voice decoding parameter and the first voice decoded signal.

Referring to FIG. 3-B, for example, the network device (for example, an RNC) in FIG. 3-B includes a voice decoder group (including multiple voice decoders), a VBWE processor group (including multiple VBWE processors), a voice encoder group (including multiple voice encoders), and a down-sampler group (including multiple down-samplers). The RNC may perform a corresponding operation by selecting a corresponding device from a corresponding device group according to a requirement.

In the embodiments of this application, for example, the NB decoder is an AMR (Adaptive Multi-Rate, adaptive multi-rate)-NB decoder or another type of NB decoder. The SWB decoder may be, for example, an EVS (Enhanced Voice Services, enhanced voice services)-SWB decoder or another type of SWB decoder. The WB decoder is, for example, an AMR-WB decoder or another type of WB decoder. The FB decoder may be, for example, an EVS-FB decoder or another type of FB decoder.

304. The RNC performs, by using the voice decoding parameter, VBWE processing to obtain a bandwidth extension voice decoded signal corresponding to the first voice decoded signal, where the voice decoding parameter may include a pitch period, a voicing factor, a linear predictive coding parameter, and the like.

It is assumed that a VBWE processor group including multiple VBWE processors (for example, the VBWE processor group may include an NB-VBWE processor, a WB-VBWE processor, an SWB VBWE processor, and an FB VBWE processor) exists in the RNC. The RNC may select, based on the maximum frequency bandwidth (for example, WB) supported by the wideband terminal, the WB VBWE processor from multiple VBWE processors, and perform, by using the voice decoding parameter, VBWE processing to obtain the bandwidth extension voice decoded signal corresponding to the first voice decoded signal.

For example, that the virtual bandwidth extension processing is performed by using the voice decoding parameter to obtain the bandwidth extension voice decoded signal corresponding to the first voice decoded signal may include: estimating, by using the voice decoding parameter, a bandwidth extension excitation signal corresponding to the first voice decoded signal; estimating, by using the voice decoding parameter, a bandwidth extension spectral envelope corresponding to the first voice decoded signal; and performing, by using a filter corresponding to the bandwidth extension spectral envelope, synthesis processing on the bandwidth extension excitation signal to obtain the bandwidth extension voice decoded signal corresponding to the first voice decoded signal.

For example, that the bandwidth extension excitation signal corresponding to the first voice decoded signal is estimated by using the voice decoding parameter may include: estimating, by using the voice decoding parameter (for example, a voice decoding parameter such as a pitch period or a voicing factor) and based on a spectrum folding algorithm, a white noise excitation algorithm, or a harmonic noise model algorithm, the bandwidth extension excitation signal corresponding to the first voice decoded signal.

For example, that the bandwidth extension spectral envelope corresponding to the first voice decoded signal is estimated by using the voice decoding parameter may include: estimating, by using the voice decoding parameter (for example, a voice decoding parameter such as a linear predictive coding parameter) and based on a linear mapping method, a codebook mapping method, or a statistics mapping method, the bandwidth extension spectral envelope corresponding to the first voice decoded signal.

305. After combining the first voice decoded signal and the bandwidth extension voice decoded signal, the RNC performs voice coding processing to obtain a second voice coded signal.

The frequency bandwidth of the first voice coded signal is less than a frequency bandwidth of the second voice coded signal. The sampling rate of the first voice coded signal is less than a sampling rate of the second voice coded signal. For example, the sampling rate of the second voice coded signal is 16 kHz, and the frequency bandwidth of the second voice coded signal is BW2.

The bandwidth extension voice decoded signal corresponding to the first voice decoded signal includes a high bandwidth extension voice decoded signal whose frequency bandwidth is BWE1=7000 Hz−3400 Hz=3600 Hz. If the bandwidth extension voice decoded signal corresponding to the first voice decoded signal includes the high bandwidth extension voice decoded signal but does not include a low bandwidth extension voice decoded signal, as shown in examples in FIG. 3-C and FIG. 3-D, BW2=BW1+BWE1=3100 Hz+(7000 Hz−3400 Hz)=6700 Hz.

In addition, if the bandwidth extension voice decoded signal corresponding to the first voice decoded signal includes the high bandwidth extension voice decoded signal and the low bandwidth extension voice decoded signal, BW2=BW1+BWE1+BWE2=3100 Hz+(300 Hz−50 Hz)+(7000 Hz−3400 Hz)=6950 Hz.

A frequency bandwidth of a low bandwidth extension voice decoded signal corresponding to the first voice decoded signal is BWE2=(300 Hz−50 Hz)=250 Hz.

It is assumed that a voice encoder group including multiple voice encoders (for example, the voice encoder group may include an NB encoder, a WB encoder, an SWB encoder, and an FB encoder) exists in the RNC. After combining the first voice decoded signal and the bandwidth extension voice decoded signal, the RNC may select, based on the maximum frequency bandwidth (WB) supported by the wideband terminal, the WB encoder from multiple voice encoders, and perform voice coding processing to obtain the second voice coded signal.

In the embodiments of this application, the NB encoder may be, for example, an AMR-NB encoder or another type of NB encoder. The SWB encoder may be, for example, an EVS-SWB encoder or another type of SWB encoder. The WB encoder is, for example, an AMR-WB encoder or another type of WB encoder. The FB encoder may be, for example, an EVS-FB encoder or another type of FB encoder.

306. The RNC sends the second voice coded signal to the wideband terminal that establishes the call connection to the narrowband terminal.

Correspondingly, the wideband terminal may receive the second voice coded signal, and perform decoding on the second voice coded signal and play a signal obtained after the decoding.

307. The wideband terminal performs coding on a voice to obtain a third voice coded signal, and sends the third voice coded signal based on the call connection.

For example, a sampling rate of the third voice coded signal is 16 kHz, and a frequency bandwidth of the third voice coded signal is BW3=(7000 Hz−300 Hz)=6700 Hz.

308. An RNC receives the third voice coded signal from the wideband terminal, and the RNC performs voice decoding processing on the third voice coded signal to obtain a third voice decoded signal.

It is assumed that a voice decoder group including multiple voice decoders (for example, the voice decoder group may include an NB decoder, a WB decoder, an SWB decoder, and an FB decoder) exists in the RNC. The RNC may select, based on the maximum frequency bandwidth (WB) supported by the wideband terminal, the WB decoder from multiple voice decoders, and perform voice decoding processing on the third voice coded signal to obtain the third voice decoded signal.

309. The RNC performs down-sampling processing on the third voice decoded signal to obtain a fourth voice decoded signal.

It is assumed that a down-sampler group including multiple down-samplers (for example, the down-sampler group may include an NB down-sampler, a WB down-sampler, an SWB down-sampler, and an FB down-sampler) exists in the RNC. The RNC may select, based on the maximum frequency bandwidth (NB) supported by the narrowband terminal, the NB down-sampler from multiple down-samplers included in the down-sampler group, and perform down-sampling processing on the third voice decoded signal to obtain the fourth voice decoded signal.

310. The RNC performs voice coding processing on the fourth voice decoded signal to obtain a fourth voice coded signal.

It is assumed that a voice encoder group including multiple voice encoders (for example, the voice encoder group may include an NB encoder, a WB encoder, an SWB encoder, and an FB encoder) exists in the RNC. The RNC may select, based on the maximum frequency bandwidth (NB) supported by the narrowband terminal, the NB encoder from multiple voice encoders included in the voice encoder group, and perform voice coding processing on the fourth voice decoded signal to obtain the fourth voice coded signal.

It can be learned that a frequency bandwidth (NB) of the fourth voice coded signal is less than a frequency bandwidth (WB) of the third voice coded signal, and a sampling rate (8 kHz) of the fourth voice coded signal is less than a sampling rate (16 kHz) of the third voice coded signal.

The frequency bandwidth of the fourth voice coded signal is BW4=(3400 Hz−300 Hz)=3100 Hz.

311. The RNC sends the fourth voice coded signal to the narrowband terminal; or after performing voice enhancement processing on the fourth voice coded signal to obtain a fourth voice coded signal obtained after the voice enhancement processing, the RNC sends the fourth voice coded signal obtained after the voice enhancement processing to the narrowband terminal.

By means of voice enhancement processing, a gain MOS of the fourth voice coded signal may not be less than a gain MOS of a voice signal that is directly sent by the wideband terminal and whose frequency bandwidth is BW1.

Product forms of a narrowband terminal and a wideband terminal may be user terminals that have a call function, for example, user equipment (UE).

It may be understood that there is no definite execution order between step 302 to step 306 and step 307 to step 311.

Referring to FIG. 3-E, an example in FIG. 3-E shows a flow direction relationship of a voice signal between a narrowband terminal, an RNC (an example of a network device), and a wideband terminal. The narrowband terminal, the RNC, and the wideband terminal may have function devices shown in the example in FIG. 3-E.

It can be learned that, in the example of the solution of this embodiment, after receiving a narrowband voice coded signal from a narrowband terminal, an RNC performs voice decoding processing on the narrowband voice coded signal to obtain a voice decoding parameter and a narrowband voice decoded signal. The RNC performs, by using the voice decoding parameter, virtual bandwidth extension processing to obtain a bandwidth extension voice decoded signal corresponding to the narrowband voice decoded signal. Then, after combining the narrowband voice decoded signal and the bandwidth extension voice decoded signal, the RNC performs voice coding processing to obtain a wideband voice coded signal, and then sends the wideband voice coded signal to a wideband terminal. The RNC at a transit location performs virtual bandwidth extension on a voice coded signal sent by the narrowband terminal to the wideband terminal. Therefore, further, a downlink voice coded signal of the wideband terminal can better match a maximum frequency bandwidth support capability of the wideband terminal, so that the wideband terminal can enjoy a voice signal bandwidth service that matches the maximum frequency bandwidth support capability of the wideband terminal. In addition, special function enhancement does not need to be performed on the wideband terminal, thereby improving call experience of a user.

Referring to FIG. 4-A, FIG. 4-A is a schematic flowchart of a voice signal processing method according to an embodiment of this application. As shown in an example in FIG. 4-A, the voice signal processing method provided in this embodiment of this application may include the following steps.

401. A call connection is established between a wideband terminal and a super wideband terminal.

402. The wideband terminal performs coding on a voice to obtain a first voice coded signal, and sends the first voice coded signal based on the call connection.

In this embodiment, it is assumed that a first terminal is the wideband terminal and a second terminal is the super wideband terminal. A maximum frequency bandwidth supported by the wideband terminal is wideband (for example, 7 kHz−50 Hz=6950 Hz), and a maximum frequency bandwidth supported by the super wideband terminal is super wideband (for example, 14 kHz−50 Hz=13950 Hz).

Specifically, for example, the wideband terminal may perform, by using an AMR WB encoder or another WB encoder, voice coding on a voice sampling signal to obtain a first voice coded signal. A sampling rate of the first voice coded signal is 16 kHz. A frequency bandwidth of the first voice coded signal is BW1=7 kHz−50 Hz=6950 Hz.

403. An RNC receives the first voice coded signal from the wideband terminal, and the RNC performs voice decoding processing on the first voice coded signal to obtain a voice decoding parameter and a first voice decoded signal.

For example, the voice decoding parameter may include a pitch period, a voicing factor, and a linear predictive coding parameter.

It is assumed that a voice decoder group including multiple voice decoders (for example, the voice decoder group may include an NB decoder, a WB decoder, an SWB decoder, and an FB decoder) exists in the RNC. The RNC may select, based on the maximum frequency bandwidth (for example, WB) supported by the wideband terminal, the WB decoder from the voice decoder group, and perform voice decoding processing on the first voice coded signal to obtain the voice decoding parameter and the first voice decoded signal.

404. The RNC performs, by using the voice decoding parameter, VBWE processing to obtain a bandwidth extension voice decoded signal corresponding to the first voice decoded signal, where the voice decoding parameter may include a pitch period, a voicing factor, a linear predictive coding parameter, and the like.

It is assumed that a VBWE processor group including multiple VBWE processors (for example, the VBWE processor group may include an NB-VBWE processor, a WB-VBWE processor, an SWB VBWE processor, and an FB VBWE processor) exists in the RNC. The RNC may select, based on the maximum frequency bandwidth (for example, SWB) supported by the super wideband terminal, the SWB VBWE processor from multiple VBWE processors, and perform, by using the voice decoding parameter, VBWE processing to obtain the bandwidth extension voice decoded signal corresponding to the first voice decoded signal.

For example, that the virtual bandwidth extension processing is performed by using the voice decoding parameter to obtain the bandwidth extension voice decoded signal corresponding to the first voice decoded signal may include: estimating, by using the voice decoding parameter, a bandwidth extension excitation signal corresponding to the first voice decoded signal; estimating, by using the voice decoding parameter, a bandwidth extension spectral envelope corresponding to the first voice decoded signal; and performing, by using a filter corresponding to the bandwidth extension spectral envelope, synthesis processing on the bandwidth extension excitation signal to obtain the bandwidth extension voice decoded signal corresponding to the first voice decoded signal.

For example, that the bandwidth extension excitation signal corresponding to the first voice decoded signal is estimated by using the voice decoding parameter may include: estimating, by using the voice decoding parameter (for example, a voice decoding parameter such as a pitch period or a voicing factor) and based on a spectrum folding algorithm, a white noise excitation algorithm, or a harmonic noise model algorithm, the bandwidth extension excitation signal corresponding to the first voice decoded signal.

For example, that the bandwidth extension spectral envelope corresponding to the first voice decoded signal is estimated by using the voice decoding parameter may include: estimating, by using the voice decoding parameter (for example, a voice decoding parameter such as a linear predictive coding parameter) and based on a linear mapping method, a codebook mapping method, or a statistics mapping method, the bandwidth extension spectral envelope corresponding to the first voice decoded signal.

405. After combining the first voice decoded signal and the bandwidth extension voice decoded signal, the RNC performs voice coding processing to obtain a second voice coded signal.

The frequency bandwidth of the first voice coded signal is less than a frequency bandwidth of the second voice coded signal. The sampling rate of the first voice coded signal is less than a sampling rate of the second voice coded signal. For example, the sampling rate of the second voice coded signal is 32 kHz, and the frequency bandwidth of the second voice coded signal is BW2.

The bandwidth extension voice decoded signal corresponding to the first voice decoded signal includes a high bandwidth extension voice decoded signal whose frequency bandwidth is BWE1=14 kHz−7 kHz=7 kHz. If the bandwidth extension voice decoded signal corresponding to the first voice decoded signal includes the high bandwidth extension voice decoded signal but does not include a low bandwidth extension voice decoded signal, $$BW2=BW1+BWE1=6950\ Hz+(14\ kHz-7\ kHz)\\=13950\ Hz.$$

It is assumed that a voice encoder group including multiple voice encoders (for example, the voice encoder group may include an NB encoder, a WB encoder, an SWB encoder, and an FB encoder) exists in the RNC. After combining the first voice decoded signal and the bandwidth extension voice decoded signal, the RNC may select, based on the maximum frequency bandwidth (SWB) supported by the super wideband terminal, the SWB encoder from multiple voice encoders, and perform voice coding processing to obtain the second voice coded signal.

406. The RNC sends the second voice coded signal to the super wideband terminal that establishes the call connection to the wideband terminal.

Correspondingly, the super wideband terminal may receive the second voice coded signal, and perform decoding on the second voice coded signal and play a signal obtained after the decoding.

407. The super wideband terminal performs coding on a voice to obtain a third voice coded signal, and sends the third voice coded signal based on the call connection.

For example, a sampling rate of the third voice coded signal is 32 kHz, and a frequency bandwidth of the third voice coded signal is BW3=(14 kHz−50 Hz)=13950 Hz.

408. An RNC receives the third voice coded signal from the super wideband terminal, and the RNC performs voice decoding processing on the third voice coded signal to obtain a third voice decoded signal.

It is assumed that a voice decoder group including multiple voice decoders (for example, the voice decoder group may include an NB decoder, a WB decoder, an SWB decoder, and an FB decoder) exists in the RNC. The RNC may select, based on the maximum frequency bandwidth (SWB) supported by the super wideband terminal, the SWB decoder from multiple voice decoders, and perform voice decoding processing on the third voice coded signal to obtain the third voice decoded signal.

409. The RNC performs down-sampling processing on the third voice decoded signal to obtain a fourth voice decoded signal.

It is assumed that a down-sampler group including multiple down-samplers (for example, the down-sampler group may include an NB down-sampler, a WB down-sampler, an SWB down-sampler, and an FB down-sampler) exists in the RNC. The RNC may select, based on the maximum frequency bandwidth (WB) supported by the wideband terminal, the WB down-sampler from multiple down-samplers included in the down-sampler group, and perform down-sampling processing on the third voice decoded signal to obtain the fourth voice decoded signal.

410. The RNC performs voice coding processing on the fourth voice decoded signal to obtain a fourth voice coded signal.

It is assumed that a voice encoder group including multiple voice encoders (for example, the voice encoder group may include an NB encoder, a WB encoder, an SWB encoder, and an FB encoder) exists in the RNC. The RNC may select, based on the maximum frequency bandwidth (WB) supported by the wideband terminal, the WB encoder from multiple voice encoders included in the voice encoder group, and perform voice coding processing on the fourth voice decoded signal to obtain the fourth voice coded signal.

It can be learned that a frequency bandwidth (WB) of the fourth voice coded signal is less than a frequency bandwidth (SWB) of the third voice coded signal, and a sampling rate (16 kHz) of the fourth voice coded signal is less than a sampling rate (32 kHz) of the third voice coded signal.

The frequency bandwidth of the fourth voice coded signal is BW4=(7000 Hz−500 Hz)=6950 Hz.

411. The RNC sends the fourth voice coded signal to the wideband terminal; or after performing voice enhancement processing on the fourth voice coded signal to obtain a fourth voice coded signal obtained after the voice enhancement processing, the RNC sends the fourth voice coded signal obtained after the voice enhancement processing to the wideband terminal.

By means of voice enhancement processing, a gain MOS of the fourth voice coded signal may not be less than a gain MOS of a voice signal that is directly sent by the wideband terminal and whose frequency bandwidth is BW1.

Product forms of a wideband terminal and a super wideband terminal may be user terminals that have a call function, for example, user equipment (UE).

It may be understood that there is no definite execution order between step 402 to step 406 and step 407 to step 411.

Referring to FIG. 4-B, an example in FIG. 4-B shows a flow direction relationship of a voice signal between a wideband terminal, an RNC (an example of a network device), and a super wideband terminal. The wideband terminal, the RNC, and the super wideband terminal may have function devices shown in the example in FIG. 4-B.

It can be learned that, in the example of the solution of this embodiment, after receiving a wideband voice coded signal from a wideband terminal, a network device (RNC) performs voice decoding processing on the wideband voice coded signal to obtain a voice decoding parameter and a wideband voice decoded signal. The RNC performs, by using the voice decoding parameter, virtual bandwidth extension processing to obtain a bandwidth extension voice decoded signal corresponding to the wideband voice decoded signal. Then, after combining the wideband voice decoded signal and the bandwidth extension voice decoded signal, the RNC performs voice coding processing to obtain a super wideband voice coded signal, and then sends the super wideband voice coded signal to a super wideband terminal. The RNC at a transit location performs virtual bandwidth extension on a voice coded signal sent by the wideband terminal to the super wideband terminal. Therefore, further, a downlink voice coded signal of the super wideband terminal can better match a maximum frequency bandwidth support capability of the super wideband terminal, so that the super wideband terminal can enjoy a voice signal bandwidth service that matches the maximum frequency bandwidth support capability of the super wideband terminal. In addition, special function enhancement does not need to be performed on the super wideband terminal, thereby improving call experience of a user.

In the example of FIG. 3-A, a first terminal is a narrowband terminal and a second terminal is a wideband terminal; in the example of FIG. 4-A, a first terminal is a wideband terminal and a second terminal is a super wideband terminal. A situation in which a first terminal and a second terminal each are another type of terminal may be learned by analogy.

Referring to FIG. 5, an embodiment of this application provides a network device 500, including:

a communications interface 510, configured to receive a first voice coded signal from a first terminal;

a first voice decoder 520, configured to perform voice decoding processing on the first voice coded signal to obtain a voice decoding parameter and a first voice decoded signal;

a first virtual bandwidth extension processor 530, configured to perform, by using the voice decoding parameter, virtual bandwidth extension processing to obtain a bandwidth extension voice decoded signal corresponding to the first voice decoded signal; and a first voice encoder 540, configured to: after combining the first voice decoded signal and the bandwidth extension voice decoded signal, perform voice coding processing to obtain a second voice coded signal, where a frequency bandwidth of the first voice coded signal is less than a frequency bandwidth of the second voice coded signal, and a sampling rate of the first voice coded signal is less than a sampling rate of the second voice coded signal; where the communications interface 510 is further configured to send the second voice coded signal to a second terminal that establishes a call connection to the first terminal, and a maximum frequency bandwidth supported by the first terminal is less than a maximum frequency bandwidth supported by the second terminal.

In some possible implementation manners of the present disclosure, the first virtual bandwidth extension processor 530 is specifically configured to: estimate, by using the voice decoding parameter, a bandwidth extension excitation signal corresponding to the first voice decoded signal; estimate, by using the voice decoding parameter, a bandwidth extension spectral envelope corresponding to the first voice decoded signal; and perform, by using a filter corresponding to the bandwidth extension spectral envelope, synthesis processing on the bandwidth extension excitation signal to obtain the bandwidth extension voice decoded signal corresponding to the first voice decoded signal.

In some possible implementation manners of the present disclosure, in a process of estimating, by using the voice decoding parameter, the bandwidth extension excitation signal corresponding to the first voice decoded signal, the first virtual bandwidth extension processor 530 is specifically configured to estimate, by using the voice decoding parameter and based on a spectrum folding algorithm, a white noise excitation algorithm, or a harmonic noise model algorithm, the bandwidth extension excitation signal corresponding to the first voice decoded signal.

In some possible implementation manners of the present disclosure, in a process of estimating, by using the voice decoding parameter, the bandwidth extension spectral envelope corresponding to the first voice decoded signal, the first virtual bandwidth extension processor 530 is specifically configured to estimate, by using the voice decoding parameter and based on a linear mapping method, a codebook mapping method, or a statistics mapping method, the bandwidth extension spectral envelope corresponding to the first voice decoded signal.

In some possible implementation manners of the present disclosure, the voice decoding parameter includes a pitch period, a voicing factor, and a linear predictive coding parameter.

In some possible implementation manners of the present disclosure, the network device includes multiple voice decoders, and the first voice decoder is a voice decoder that is in multiple voice decoders and that is corresponding to the maximum frequency bandwidth supported by the first terminal.

In some possible implementation manners of the present disclosure, the network device includes multiple virtual bandwidth extension processors, and the first virtual bandwidth extension processor is a virtual bandwidth extension processor that is in multiple virtual bandwidth extension processors and that is corresponding to the maximum frequency bandwidth supported by the second terminal.

In some possible implementation manners of the present disclosure, the network device includes multiple voice encoders, and the first voice encoder is a voice encoder that is in multiple voice encoders and that is corresponding to the maximum frequency bandwidth supported by the second terminal.

In some possible implementation manners of the present disclosure, for example, frequency bandwidths of the first voice coded signal and the second voice coded signal are two of the following frequency bandwidths: narrowband, wideband, super wideband, or full band.

In some possible implementation manners of the present disclosure, the network device 500 further includes a second voice decoder 550, a second voice encoder 570, and a first down-sampler 560.

The communications interface 510 is further configured to receive a third voice coded signal from the second terminal.

The second voice decoder 550 is configured to perform voice decoding processing on the third voice coded signal to obtain a third voice decoded signal.

The first down-sampler 560 is configured to perform down-sampling processing on the third voice decoded signal to obtain a fourth voice decoded signal.

The second voice encoder 570 is configured to perform voice coding processing on the fourth voice decoded signal to obtain a fourth voice coded signal, where a frequency bandwidth of the fourth voice coded signal is less than a frequency bandwidth of the third voice coded signal, and a sampling rate of the fourth voice coded signal is less than a sampling rate of the third voice coded signal.

The communications interface 510 is further configured to send the fourth voice coded signal to the first terminal; or the communications interface 510 is further configured to: after performing voice enhancement processing on the fourth voice coded signal to obtain a fourth voice coded signal obtained after the voice enhancement processing, send the fourth voice coded signal obtained after the voice enhancement processing to the first terminal.

In some possible implementation manners of the present disclosure, the network device 500 includes multiple voice decoders, and the second voice decoder 550 is a voice decoder corresponding to the maximum frequency bandwidth supported by the second terminal.

In some possible implementation manners of the present disclosure, the network device includes multiple down-samplers, and the first down-sampler is a down-sampler that is in multiple down-samplers and that is corresponding to the maximum frequency bandwidth supported by the first terminal.

In some possible implementation manners of the present disclosure, the network device 500 includes multiple voice encoders, and the second voice encoder 570 is a voice encoder corresponding to the maximum frequency bandwidth supported by the first terminal.

In some possible implementation manners of the present disclosure, the network device is a base station, a radio network controller, or a core network device.

Figure 6:
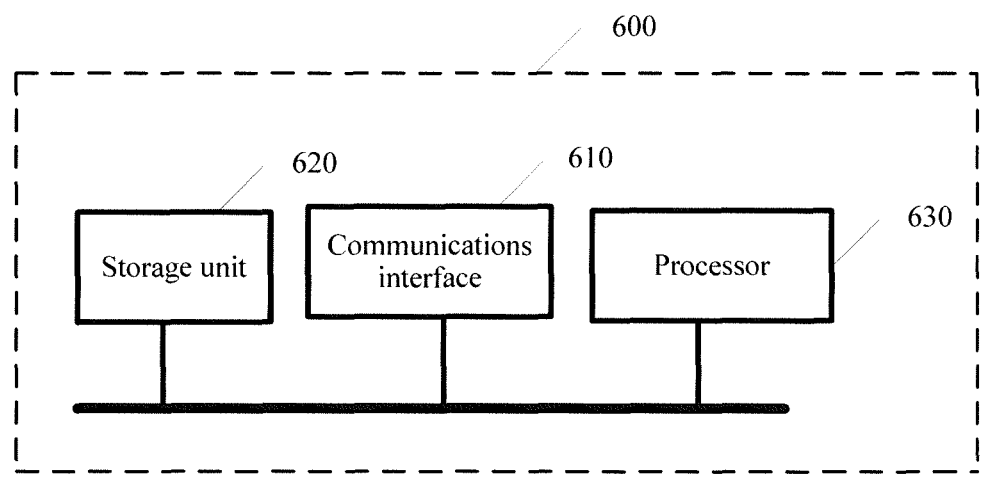
FIG. 6 is a schematic structural diagram of another network device according to an embodiment of the present disclosure.

Referring to FIG. 6, an embodiment of the present disclosure provides a network device 600, including:

a storage unit 620, a communications interface 610, and a processor 630 coupled to the storage unit 620 and the communications interface 610. The storage unit 620 is configured to store an instruction, the processor 630 is configured to execute the instruction, and the communications interface 610 is configured to communicate with another device under control of the processor 630. When executing the instruction, the processor 630 may perform, according to the instruction, any voice signal processing method in the foregoing embodiment.

Specifically, the processor 630 is configured to: receive a first voice coded signal from a first terminal by using the communications interface 610; perform voice decoding processing on the first voice coded signal to obtain a voice decoding parameter and a first voice decoded signal; perform, by using the voice decoding parameter, virtual bandwidth extension processing to obtain a bandwidth extension voice decoded signal corresponding to the first voice decoded signal; after combining the first voice decoded signal and the bandwidth extension voice decoded signal, perform voice coding processing to obtain a second voice coded signal, where a frequency bandwidth of the first voice coded signal is less than a frequency bandwidth of the second voice coded signal, and a sampling rate of the first voice coded signal is less than a sampling rate of the second voice coded signal; and send, by using the communications interface 610, the second voice coded signal to a second terminal that establishes a call connection to the first terminal, and a maximum frequency bandwidth supported by the first terminal is less than a maximum frequency bandwidth supported by the second terminal.

In some possible implementation manners of the present disclosure, the processor 630 is specifically configured to: estimate, by using the voice decoding parameter, a bandwidth extension excitation signal corresponding to the first voice decoded signal; estimate, by using the voice decoding parameter, a bandwidth extension spectral envelope corresponding to the first voice decoded signal; and perform, by using a filter corresponding to the bandwidth extension spectral envelope, synthesis processing on the bandwidth extension excitation signal to obtain the bandwidth extension voice decoded signal corresponding to the first voice decoded signal.

In some possible implementation manners of the present disclosure, in a process of estimating, by using the voice decoding parameter, the bandwidth extension excitation signal corresponding to the first voice decoded signal, the processor 630 is specifically configured to estimate, by using the voice decoding parameter and based on a spectrum folding algorithm, a white noise excitation algorithm, or a harmonic noise model algorithm, the bandwidth extension excitation signal corresponding to the first voice decoded signal.

In some possible implementation manners of the present disclosure, in a process of estimating, by using the voice decoding parameter, the bandwidth extension spectral envelope corresponding to the first voice decoded signal, the processor 630 is specifically configured to estimate, by using the voice decoding parameter and based on a linear mapping method, a codebook mapping method, or a statistics mapping method, the bandwidth extension spectral envelope corresponding to the first voice decoded signal.

In some possible implementation manners of the present disclosure, the voice decoding parameter includes a pitch period, a voicing factor, and a linear predictive coding parameter.

In some possible implementation manners of the present disclosure, for example, frequency bandwidths of the first voice coded signal and the second voice coded signal are two of the following frequency bandwidths: narrowband, wideband, super wideband, or full band.

In some possible implementation manners of the present disclosure, the processor 630 is further configured to: receive a third voice coded signal from the second terminal by using the communications interface 610; perform voice decoding processing on the third voice coded signal to obtain a third voice decoded signal; perform down-sampling processing on the third voice decoded signal to obtain a fourth voice decoded signal; perform voice coding processing on the fourth voice decoded signal to obtain a fourth voice coded signal, where a frequency bandwidth of the fourth voice coded signal is less than a frequency bandwidth of the third voice coded signal, and a sampling rate of the fourth voice coded signal is less than a sampling rate of the third voice coded signal; and send the fourth voice coded signal to the first terminal by using the communications interface 610, or after performing voice enhancement processing on the fourth voice coded signal to obtain a fourth voice coded signal obtained after the voice enhancement processing, send, by using the communications interface 610, the fourth voice coded signal obtained after the voice enhancement processing to the first terminal.

In some possible implementation manners of the present disclosure, the network device 600 may be, for example, a base station, a radio network controller, a core network device, or a network telephony server.

It can be learned that, in the foregoing technical solution, after receiving a first voice coded signal from a first terminal supporting a relatively narrow bandwidth, a network device 600 performs voice decoding processing on the first voice coded signal to obtain a voice decoding parameter and a first voice decoded signal. The network device 600 performs, by using the voice decoding parameter, virtual bandwidth extension processing to obtain a bandwidth extension voice decoded signal corresponding to the first voice decoded signal. Then, after combining the first voice decoded signal and the bandwidth extension voice decoded signal, the network device 600 performs voice coding processing to obtain a second voice coded signal, and then sends the second voice coded signal to a second terminal supporting a relatively wide bandwidth. The network device 600 at a transit location performs virtual bandwidth extension on a voice coded signal that is sent by the first terminal supporting a relatively narrow bandwidth to the second terminal supporting a relatively wide bandwidth. Therefore, further, a downlink voice coded signal of the second terminal supporting a relatively wide bandwidth can better match a maximum frequency bandwidth support capability of the second terminal, so that the second terminal supporting a relatively wide bandwidth can enjoy a voice signal bandwidth service that matches the maximum frequency bandwidth support capability of the second terminal. In addition, special function enhancement does not need to be performed on the second terminal, thereby improving call experience of a user. It can be learned that, in the foregoing example, service quality of terminals that have asymmetric maximum frequency bandwidth support capabilities can be improved.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual indirect couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a read-only memory (ROM, Read-Only Memory), a random access memory (RAM, Random Access Memory), a removable hard disk, a magnetic disk, or an optical disc.

The invention claimed is:

1. A voice signal processing method, comprising:
   receiving, by a network device, a first voice coded signal from a first terminal;
   performing, by the network device, voice decoding processing on the first voice coded signal to obtain a voice decoding parameter and a first voice decoded signal;
   performing, by the network device by using the voice decoding parameter, virtual bandwidth extension processing to obtain a bandwidth extension voice decoded signal corresponding to the first voice decoded signal;
   after combining the first voice decoded signal and the bandwidth extension voice decoded signal, performing, by the network device, voice coding processing to obtain a second voice coded signal, wherein a frequency bandwidth of the first voice coded signal is less than a frequency bandwidth of the second voice coded signal, and a sampling rate of the first voice coded signal is less than a sampling rate of the second voice coded signal; and sending, by the network device, the second voice coded signal to a second terminal that establishes a call connection to the first terminal, wherein a maximum frequency bandwidth supported by the first terminal is less than a maximum frequency bandwidth supported by the second terminal.

2. The method according to claim 1, wherein the performing, by using the voice decoding parameter, virtual bandwidth extension processing to obtain a bandwidth extension voice decoded signal corresponding to the first voice decoded signal comprises:

estimating, by using the voice decoding parameter, a bandwidth extension excitation signal corresponding to the first voice decoded signal; estimating, by using the voice decoding parameter, a bandwidth extension spectral envelope corresponding to the first voice decoded signal; and performing, by using a filter corresponding to the bandwidth extension spectral envelope, synthesis processing on the bandwidth extension excitation signal to obtain the bandwidth extension voice decoded signal corresponding to the first voice decoded signal.

3. The method according to claim 2, wherein the estimating, by using the voice decoding parameter, a bandwidth extension excitation signal corresponding to the first voice decoded signal comprises: estimating, by using the voice decoding parameter and based on a spectrum folding algorithm, a white noise excitation algorithm, or a harmonic noise model algorithm, the bandwidth extension excitation signal corresponding to the first voice decoded signal.

4. The method according to claim 2, wherein the estimating, by using the voice decoding parameter, a bandwidth extension spectral envelope corresponding to the first voice decoded signal comprises: estimating, by using the voice decoding parameter and based on a linear mapping method, a codebook mapping method, or a statistics mapping method, the bandwidth extension spectral envelope corresponding to the first voice decoded signal.

5. The method according to claim 1, wherein the voice decoding parameter comprises a pitch period, a voicing factor, and a linear predictive coding parameter.

6. The method according to claim 1, wherein the performing voice decoding processing on the first voice coded signal to obtain a voice decoding parameter and a first voice decoded signal comprises: selecting, from multiple voice decoders, a voice decoder corresponding to the maximum frequency bandwidth supported by the first terminal, and performing the voice decoding processing on the first voice coded signal to obtain the voice decoding parameter and the first voice decoded signal; or the performing, by using the voice decoding parameter, virtual bandwidth extension processing to obtain a bandwidth extension voice decoded signal corresponding to the first voice decoded signal comprises: selecting, from multiple virtual bandwidth extension processors, a virtual bandwidth extension processor corresponding to the maximum frequency bandwidth supported by the second terminal, and performing, by using the voice decoding parameter, the virtual bandwidth extension processing to obtain the bandwidth extension voice decoded signal corresponding to the first voice decoded signal; or after combining the first voice decoded signal and the bandwidth extension voice decoded signal, the performing voice coding processing to obtain a second voice coded signal comprises: selecting, from multiple voice encoders, a voice encoder corresponding to the maximum frequency bandwidth supported by the second terminal, and after combining the first voice decoded signal and the bandwidth extension voice decoded signal, performing the voice coding processing to obtain the second voice coded signal.

7. The method according to claim 1, wherein:
frequency bandwidths of the first voice coded signal and the second voice coded signal are two of the following frequency bandwidths: narrowband, wideband, super wideband, or full band.

8. The method according to claim 1, wherein the voice signal processing method further comprises:

receiving, by the network device, a third voice coded signal from the second terminal;

performing, by the network device, voice decoding processing on the third voice coded signal to obtain a third voice decoded signal;

performing, by the network device, down-sampling processing on the third voice decoded signal to obtain a fourth voice decoded signal; and performing, by the network device, voice coding processing on the fourth voice decoded signal to obtain a fourth voice coded signal, wherein a frequency bandwidth of the fourth voice coded signal is less than a frequency bandwidth of the third voice coded signal, and a sampling rate of the fourth voice coded signal is less than a sampling rate of the third voice coded signal; and sending, by the network device, the fourth voice coded signal to the first terminal; or after the network device performs voice enhancement processing on the fourth voice coded signal to obtain a fourth voice coded signal obtained after the voice enhancement processing, sending the fourth voice coded signal obtained after the voice enhancement processing to the first terminal.

9. The method according to claim 8, wherein the performing voice decoding processing on the third voice coded signal to obtain a third voice decoded signal comprises: selecting, from multiple voice decoders, a voice decoder corresponding to the maximum frequency bandwidth supported by the second terminal, and performing the voice decoding processing on the third voice coded signal to obtain the third voice decoded signal; or the performing down-sampling processing on the third voice decoded signal to obtain a fourth voice decoded signal comprises: selecting, multiple down-samplers, a down-sampler corresponding to the maximum frequency bandwidth supported by the first terminal, and performing the down-sampling processing on the third voice decoded signal to obtain the fourth voice decoded signal; or the performing voice coding processing on the fourth voice decoded signal to obtain a fourth voice coded signal comprises: selecting, from multiple voice encoders, a voice encoder corresponding to the maximum frequency bandwidth supported by the first terminal, and performing the voice coding processing on the fourth voice decoded signal to obtain the fourth voice coded signal.

10. The method according to claim 1, wherein the network device is a base station, a radio network controller, or a core network device.

11. A network device, comprising:
a communications interface to receive a first voice coded signal from a first terminal;
a first voice decoder to perform voice decoding processing on the first voice coded signal to obtain a voice decoding parameter and a first voice decoded signal;
a first virtual bandwidth extension processor to perform, by using the voice decoding parameter, virtual bandwidth extension processing to obtain a bandwidth extension voice decoded signal corresponding to the first voice decoded signal; and
a first voice encoder to: after combining the first voice decoded signal and the bandwidth extension voice decoded signal, perform voice coding processing to obtain a second voice coded signal, wherein a frequency bandwidth of the first voice coded signal is less than a frequency bandwidth of the second voice coded signal, and a sampling rate of the first voice coded signal is less than a sampling rate of the second voice coded signal; wherein
the communications interface to send the second voice coded signal to a second terminal that establishes a call connection to the first terminal, and a maximum frequency bandwidth supported by the first terminal is less than a maximum frequency bandwidth supported by the second terminal.

12. The network device according to claim 11, wherein:
the first virtual bandwidth extension processor to: estimate, by using the voice decoding parameter, a bandwidth extension excitation signal corresponding to the first voice decoded signal; estimate, by using the voice decoding parameter, a bandwidth extension spectral envelope corresponding to the first voice decoded signal; and perform, by using a filter corresponding to the bandwidth extension spectral envelope, synthesis processing on the bandwidth extension excitation signal to obtain the bandwidth extension voice decoded signal corresponding to the first voice decoded signal.

13. The network device according to claim 12, wherein:
in a process of estimating, by using the voice decoding parameter, the bandwidth extension excitation signal corresponding to the first voice decoded signal, the first virtual bandwidth extension processor to estimate, by using the voice decoding parameter and based on a spectrum folding algorithm, a white noise excitation algorithm, or a harmonic noise model algorithm, the bandwidth extension excitation signal corresponding to the first voice decoded signal.

14. The network device according to claim 12, wherein:
in a process of estimating, by using the voice decoding parameter, the bandwidth extension spectral envelope corresponding to the first voice decoded signal, the first virtual bandwidth extension processor to estimate, by using the voice decoding parameter and based on a linear mapping method, a codebook mapping method, or a statistics mapping method, the bandwidth extension spectral envelope corresponding to the first voice decoded signal.

15. The network device according to claim 11, wherein the voice decoding parameter comprises a pitch period, a voicing factor, and a linear predictive coding parameter.

16. The network device according to claim 11, wherein the network device comprises multiple voice decoders, and the first voice decoder is a voice decoder that is in multiple voice decoders and that is corresponding to the maximum frequency bandwidth supported by the first terminal; or,
the network device comprises multiple virtual bandwidth extension processors, and the first virtual bandwidth extension processor is a virtual bandwidth extension processor that is in multiple virtual bandwidth extension processors and that is corresponding to the maximum frequency bandwidth supported by the second terminal; or
the network device comprises multiple voice encoders, and the first voice encoder is a voice encoder that is in multiple voice encoders and that is corresponding to the maximum frequency bandwidth supported by the second terminal.

17. The network device according to claim 11, wherein frequency bandwidths of the first voice coded signal and the second voice coded signal are two of the following frequency bandwidths: narrowband, wideband, super wideband, or full band.

18. The network device according to claim 11, wherein the network device further comprises a second voice decoder, a second voice encoder, and a first down-sampler;
the communications interface is further to receive a third voice coded signal from the second terminal;
the second voice decoder to perform voice decoding processing on the third voice coded signal to obtain a third voice decoded signal;
the first down-sampler is to perform down-sampling processing on the third voice decoded signal to obtain a fourth voice decoded signal;
the second voice encoder is to perform voice coding processing on the fourth voice decoded signal to obtain a fourth voice coded signal, wherein a frequency bandwidth of the fourth voice coded signal is less than a frequency bandwidth of the third voice coded signal, and a sampling rate of the fourth voice coded signal is less than a sampling rate of the third voice coded signal; and
the communications interface is further to send the fourth voice coded signal to the first terminal; or the communications interface is further configured to: after performing voice enhancement processing on the fourth voice coded signal to obtain a fourth voice coded signal obtained after the voice enhancement processing, send the fourth voice coded signal obtained after the voice enhancement processing to the first terminal.

19. The network device according to claim 18, wherein the network device comprises multiple voice decoders, and the second voice decoder is a voice decoder corresponding to the maximum frequency bandwidth supported by the second terminal; or
the network device comprises multiple down-samplers, and the first down-sampler is a down-sampler that is in multiple down-samplers and that is corresponding to the maximum frequency bandwidth supported by the first terminal; or
the network device comprises multiple voice encoders, and the second voice encoder is a voice encoder corresponding to the maximum frequency bandwidth supported by the first terminal.

20. The network device according to claim 11, wherein the network device is a base station, a radio network controller, or a core network device.

* * * * *